United States Patent
Oono

(10) Patent No.: US 9,052,204 B2
(45) Date of Patent: Jun. 9, 2015

(54) BEHAVIOR PATTERN EXTRACTION SYSTEM, APPARATUS, METHOD AND RECORDING MEDIUM STORING PROGRAM

(75) Inventor: Takeo Oono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 466 days.

(21) Appl. No.: 13/502,048

(22) PCT Filed: Oct. 12, 2010

(86) PCT No.: PCT/JP2010/067867
§ 371 (c)(1),
(2), (4) Date: Apr. 13, 2012

(87) PCT Pub. No.: WO2011/046113
PCT Pub. Date: Apr. 21, 2011

(65) Prior Publication Data
US 2012/0203732 A1 Aug. 9, 2012

(30) Foreign Application Priority Data
Oct. 14, 2009 (JP) ................................. 2009-237423

(51) Int. Cl.
*G06N 5/02* (2006.01)
*G01C 21/20* (2006.01)
(Continued)

(52) U.S. Cl.
CPC ........ *G01C 21/20* (2013.01); *G06N 5/04* (2013.01); *G01C 21/26* (2013.01); *H04M 1/72572* (2013.01); *H04W 4/028* (2013.01)

(58) Field of Classification Search
None
See application file for complete search history.

(56) References Cited

U.S. PATENT DOCUMENTS

2006/0156209 A1  7/2006  Matsuura et al.
2010/0070456 A1* 3/2010 Sugihara et al. ............... 706/54
(Continued)

FOREIGN PATENT DOCUMENTS

JP  10-176929 A  6/1998
JP  2000-180199 A  6/2000
(Continued)

OTHER PUBLICATIONS

Zheng, Y. et al. "Mining interesting locations and travel sequences from GPS trajectories." Proceedings of the 18th international conference on World wide web. ACM, Apr. 20-24, 2009. pp. 791-800. DOI: 10.1145/1526709.1526816.*
(Continued)

*Primary Examiner* — Jeffrey A Gaffin
*Assistant Examiner* — Benjamin Buss
(74) *Attorney, Agent, or Firm* — Sughrue Mion, PLLC

(57) ABSTRACT

There is provided a behavior pattern extraction system which can extract user's behavior pattern with high accuracy. The behavior pattern extraction system includes: a location information acquiring section measuring location points which each indicate a location of a user; a staying point extraction section setting staying points and staying records based on an range in which location points which are each measured in a first period are concentrated, wherein the staying points each indicate a location where the user has stayed temporarily; a representative staying point extraction section setting a representative staying point and a representative staying record based on an range in which the staying points which are set in a second period which is longer than the first period are concentrated, wherein the representative staying point indicates a location where the user has repeatedly visited, and the representative staying record indicates an error range of the location of the representative staying point; and a behavior pattern record section recording the representative staying point and the representative staying record in a storage area as behavior pattern information of the user.

21 Claims, 16 Drawing Sheets

(51) Int. Cl.
*G06N 5/04* (2006.01)
*G01C 21/26* (2006.01)
*H04W 4/02* (2009.01)
*H04M 1/725* (2006.01)

(56) References Cited

U.S. PATENT DOCUMENTS

2010/0211308 A1* 8/2010 Zheng et al. .............. 706/46
2011/0081634 A1* 4/2011 Kurata et al. .............. 434/236
2012/0278320 A1* 11/2012 Ogura ....................... 707/736

FOREIGN PATENT DOCUMENTS

| JP | 2001-101562 A | 4/2001 |
| JP | 2004-112482 A | 4/2004 |
| JP | 2006-12144 A | 1/2006 |
| JP | 2007-71801 A | 3/2007 |
| JP | 2008-146248 A | 6/2008 |
| JP | 2008-146249 A | 6/2008 |

OTHER PUBLICATIONS

Asakura, Y. et a. "Tracking survey for individual travel behaviour using mobile communication instruments." Transportation Research Part C: Emerging Technologies 12.3 (2004): 273-291. DOI: 10.1016/j.trc.2004.07.010.*

Zhou, C. et al. "Discovering personal gazetteers: an interactive clustering approach." Proceedings of the 12th annual ACM international workshop on Geographic information systems. ACM, 2004. pp. 1029-1038. DOI: 10.1145/1772690.1772795.*

Ashbrook, D. et al. "Using GPS to learn significant locations and predict movement across multiple users." Personal and Ubiquitous Computing 7.5 (2003): 275-286. DOI: 10.1007/s00779-003-0240-0.*

Ye Y. et al. "Mining individual life pattern based on location history." Mobile Data Management: Systems, Services and Middleware, 2009. MDM'09. Tenth International Conference on. IEEE, May 18-20, 2009. DOI: 10.1109/MDM.2009.11.*

Okamoto, A. et al. "A Data Collection System for Detailed Person Movements in an Urban Space based on Mobile Communication Technologies: Seeking a Market Survey Technique for Urban Management." Memoirs-Faculty of Engineering Osaka City University 44 (2003): 67-72.*

Ito, M. et al. "mPATH: an interactive visualization framework for behavior history." Advanced Information Networking and Applications, 2005. AINA 2005. 19th International Conference on. vol. 1. IEEE, 2005. DOI: 10.1109/AINA.2005.253.*

Written Opinion of the International Searching Authority dated Dec. 7, 2010 in counterpart application No. PCT/JP2010/067867.

* cited by examiner

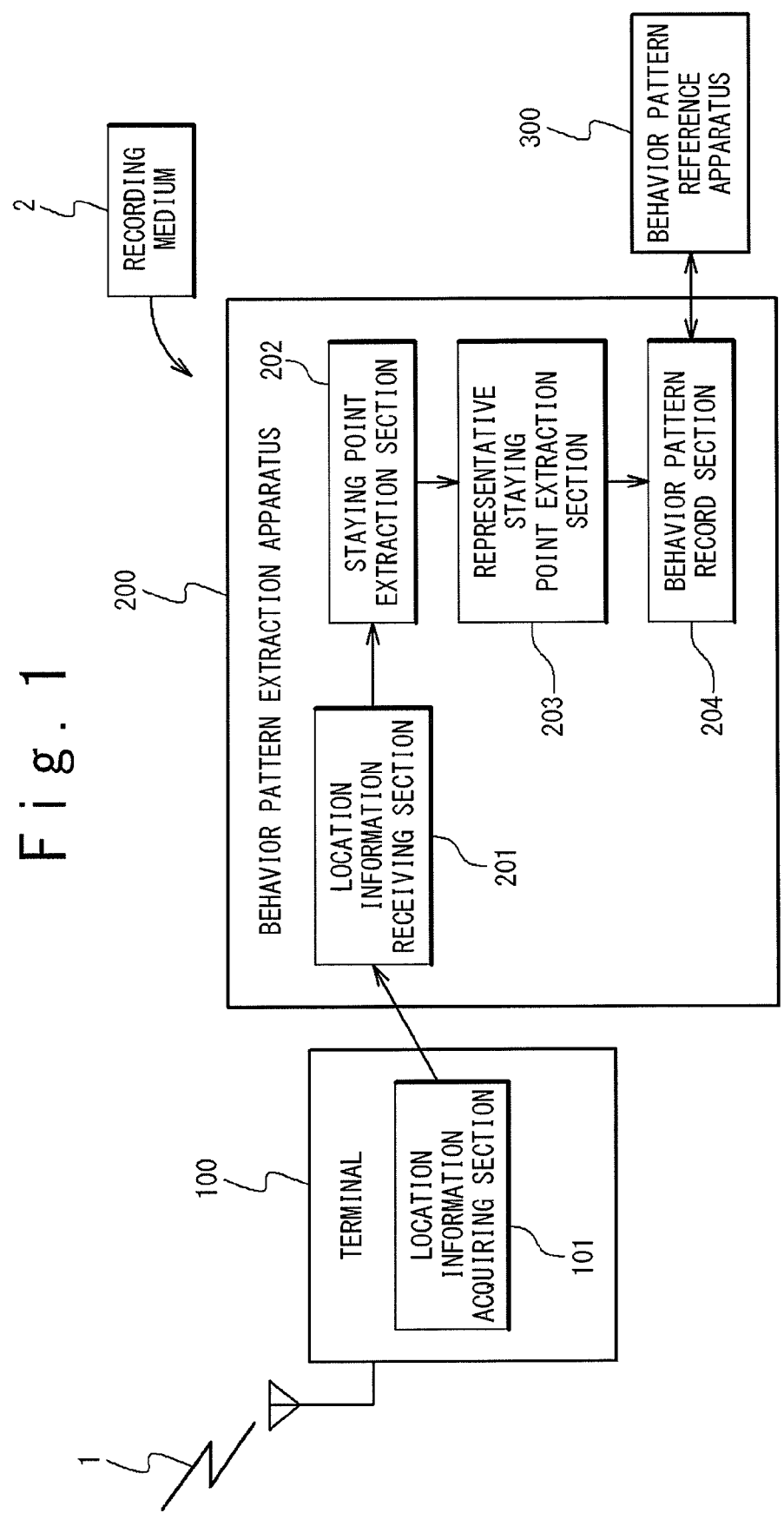

Fig. 14

| TERMINAL IDENTIFIER | REPRESENTATIVE STAYING RECORD NUMBER | REPRESENTATIVE STAYING POINT | LOCATION MEASUREMENT ACCURACY (m) | TOTAL STAYING TIME (MINUTE) | NUMBER OF STAYS (NUMBER) |
|---|---|---|---|---|---|
| A | 1 | (x1, y1) | 5 | 90 | 3 |
| A | 2 | (x2, y2) | 10 | 60 | 1 |

LOCATION MEASUREMENT TIMES 12-1 TO 12-4
OF LOCATION POINTS 10-1 TO 10-4

BEHAVIOR PATTERN EXTRACTION SYSTEM, APPARATUS, METHOD AND RECORDING MEDIUM STORING PROGRAM

CROSS REFERENCE TO RELATED APPLICATIONS

This application is a National Stage of International Application No. PCT/JP2010/067867, filed on Oct. 12, 2010, which claims priority from Japanese Patent Application No. 2009-237423, filed on Oct. 14, 2009, the contents of all of which are incorporated herein by reference in their entirety.

TECHNICAL FIELD

The present invention relates to a behavior pattern extraction system which extracts a behavior pattern of a user on the basis of location information.

BACKGROUND ART

Recently, there is provided an environment in which location information of users is periodically acquired by terminals incorporating a GPS (global positioning system). Services offered by using the location information acquired by the GPS include a service for displaying a map near the user and a service which shows the way from the current location to the destination. These services are provided on the basis of the current location of the user. Provisions of further advanced services in the future have been studied, such as a service which uses user's behavior patterns extracted on the basis of the acquisition histories of the location information. Related techniques using location information are disclosed as follows:

Patent Document 1 discloses a behavior history output apparatus which can output a behavior history even by using a mobile information technology device with relatively low processing power. The behavior history output apparatus includes a location information acquisition means, a time acquisition means, a location name database, a location name retrieving means and an output means. The location information acquisition means repeatedly acquires location information at predetermined timings. The time acquisition means acquires the time when the location information is acquired. The location name database stores location names corresponding to location information. The location name retrieving means retrieves location names from the location name database on the basis of the acquired location information. The output means outputs the retrieved location names in chronological order. The behavior history output apparatus of patent document 1 enables real-time acquisition of the behavior histories even by using an information apparatus with relatively poor processing power and hardware, including a memory, such as a mobile information technology device.

Also, patent document 2 discloses a location detection method which can estimate the location of a wireless communication terminal with high accuracy. The location detection method of patent document 2 is a detection method used in a system including: a plurality of base stations connected to a communication network; a plurality of wireless communication terminals including at least a transmitting means and operating as mobile stations connected to the base stations by wireless; and an information server managing information including the location information of the wireless communication terminals. The base stations each receive wireless signals transmitted from the wireless communication terminals, and measure the reception signal levels of the received signals to inform the information server. The information server acknowledges the reception signal levels informed from the base stations, finds by using the reception signal levels the ranges where the wireless communication terminals corresponding to the reception signal levels are potentially located, and detects the locations of the wireless communication terminals on the basis of the overlapping of the respective ranges. The location detection method of patent document 2 effectively overcomes a problem that the location cannot be estimated accurately when the reception signal levels vary due to environments around the transmitting stations, and realizes a location detection system which can estimate the locations of the wireless communication terminals with high accuracy.

In patent document 1, it is presumed that the location information is acquired from the GPS with high accuracy; however, there is some uncertainty in the acquired location even when the terminal completely stands still, because the location information is calculated on the basis of the received radio waves from satellites in the GPS. To make matters worse, the accuracy of the location information becomes low, when the terminal moves or when the terminal is located underground, where the terminal cannot receive the radio waves from the satellites. Therefore, it is impossible to accurately judge whether the terminal stands still only from the coordinate value information obtained from the GPS location information, and this makes it difficult to extract the behavior pattern with high accuracy. Also, in patent document 2, the range where the terminal is potentially located can be estimated only with a certain level, although the variations in the reception signal levels from the base stations are taken into account.

CITATION LIST

Patent Literature

Patent Document 1: Japanese Patent Application Publication No. 2000-180199
Patent Document 2: Japanese Patent Application Publication No. 2004-112482

DISCLOSURE OF INVENTION

An object of the present invention is to provide a behavior pattern extraction system which can extract a user's behavior pattern with higher accuracy.

In an aspect of the present invention, there is provided a behavior pattern extraction system. The behavior pattern extraction system includes: a location information acquiring section measuring location points which each indicate a location of a user; a staying point extraction section setting staying points and staying records based on an range in which location points which are each measured in a first period are concentrated, wherein the staying points each indicate a location where the user has stayed temporarily, and the staying records each indicate an error range of the location of each staying point; a representative staying point extraction section setting a representative staying point and a representative staying record based on an range in which the staying points which are set in a second period which is longer than the first period are concentrated, wherein the representative staying point indicates a location where the user has repeatedly visited, and the representative staying record indicates an error range of the location of the representative staying point; and a behavior pattern record section recording the representative staying point and the representative staying record in a storage area as behavior pattern information of the user.

In another aspect of the present invention, there is provided a behavior pattern extraction apparatus. The behavior pattern extraction apparatus includes the staying point extraction section, the representative staying point extraction section and the behavior pattern record section in the behavior pattern extraction system.

In still another aspect of the present invention, there is provided a behavior pattern extraction method. The behavior pattern extraction method includes: a step of measuring location points which each indicate a location of a user; a step of setting staying points and staying records based on ranges in which location points each measured in a first period are concentrated, wherein the staying points each indicate a location where the user has stayed temporarily, and the staying records each indicate an error range of the location of each staying point; setting a representative staying point and a representative staying record based on an range in which the staying points set in a second period which is longer than the first period are concentrated, wherein the representative staying point indicates a location where the user has repeatedly visited, and the representative staying record indicates an error range of the location of the representative staying point; and a step of recording the representative staying point and the representative staying record in a storage area as behavior pattern information of the user.

In still another aspect of the present invention, there is provided a computer-readable recording medium. The computer-readable recording medium records a behavior pattern extraction program which causes a computer to perform the above-described behavior pattern extraction method.

The present invention enables providing a behavior pattern extraction system which can extract a user's behavior pattern with higher accuracy.

BRIEF DESCRIPTION OF DRAWINGS

Objects, effects and features of the above-described invention will be made more apparent from the description of embodiments in cooperation with the attached drawings in which:

FIG. 1 is a function block diagram showing the configuration of a behavior pattern extraction system in a first embodiment of the present invention;

FIG. 14 is a diagram showing one example of representative staying point data recorded by the behavior pattern record section 204 in the first embodiment;

EMBODIMENTS OF INVENTION

Figure 2A:
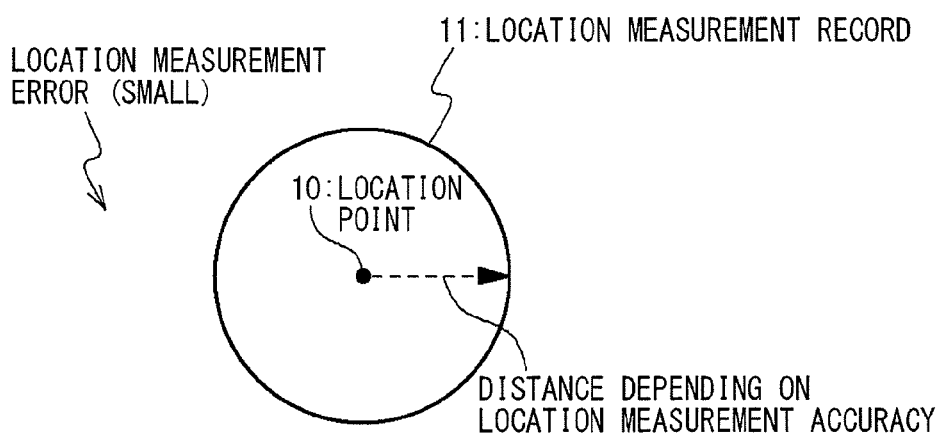
FIG. 2A is a diagram showing the relation between a location point 10 and a location measurement record 11 in the first embodiment.

Behavior pattern extraction systems according to embodiments of the present invention will be described below with reference to the attached drawings.

First Embodiment

First, a behavior pattern extraction system in a first embodiment of the present invention is described below.

In the behavior pattern extraction system in this embodiment, location information of the terminal is acquired and location measurement records, which each indicate an range where the terminal is potentially located, are set on the basis of the location measurement error of the acquired location information (location points). Next, estimated staying ranges are extracted where location measurement records of a plurality of location points each measured in a predetermined period overlap and the location point with the smallest location measurement error out of the location points in each estimated staying range is extracted as a staying point. Further, out of staying points each extracted in this matter, the range where the largest number of the location measurement records corresponding to the staying points (staying records) overlap is extracted as a representative staying range, and the staying point with the smallest error out of the staying points incorporating the representative staying range is extracted as a representative staying point which indicates the location where the user frequently stays.

As thus described, the behavior pattern can be extracted with high accuracy by extracting staying points, which each indicate the location where the user has stayed temporarily, on the basis of the overlapping of the error ranges of the location information measured in predetermined periods, and extracting the representative staying point where the user frequently stays from the range where the largest number of the error ranges of the staying points overlap. In addition, the behavior pattern can be extracted with high accuracy, since the staying points and the representative staying point are extracted as the locations with the smallest location measurement errors out of the location points for which the error ranges overlap and out of the staying points for which the error ranges overlap, respectively. The configuration and operation of such a behavior pattern extraction system of this embodiment is described in the following.

(Description of Configuration)

First, the configuration of the behavior pattern extraction system of this embodiment is described. FIG. 1 is a function block diagram showing the configuration of the behavior pattern extraction system in this embodiment. The behavior pattern extraction system of this embodiment includes a terminal 100, an extraction pattern extraction apparatus 200 and a behavior pattern reference apparatus 300.

A description is first given of the terminal 100 shown in FIG. 1. The terminal 100 is a movable information terminal. In this embodiment, the description is given with an assumption that the terminal 100 is a cellular phone terminal which is portable by the user. The terminal 100 is not limited to a cellular phone terminal; the terminal 100 may include an information terminal, such as a PDA (personal data assistant), a personal computer and a car navigation system terminal. Although only one terminal 100 is shown in FIG. 1, it should be understood that there are actually many terminals 100.

The terminal 100 communicates the behavior pattern extraction apparatus 200 via a mobile communication network (not shown in FIG. 1). The terminal 100 includes components not shown in FIG. 1, such as an antenna exchanging radio waves with wireless base stations provided in the mobile communication network and a radio interface processing section which performs an interfacing process on exchanged radio waves, such as modulation and demodulation. Such components for the terminal 100 to communicate via the mobile communication network are well-known in the art and no detailed explanations are given. It should be noted that the terminal 100 may support a different wireless communication, such as WiMAX (worldwide interoperability for microwave access) and a wireless LAN (local area network), or support a wire communication.

The terminal 100 includes location information acquiring section 101. The location information acquiring section 101 acquires location information by using a GPS (global positioning system). The terminal 100, which includes an antenna, can receive radio waves 1 transmitted from GPS satellites (not shown). The location information acquiring section 101 calculates a location point 10 which is the location of the terminal 100, based on the radio waves 1 received from the satellites. The location information acquiring section 101 also acquires the location measurement time 12 at the same time as the calculation of the location point 10. Furthermore, the location information acquiring section 101 generates location measurement accuracy information which depends on the measurement environment in which the location point 10 is calculated. The location measurement accuracy information will be described later. The location information acquiring section 100 may acquire the location of the terminal 100 from, for example, location information given to a RFID (radio frequency identification) reader provided in a specific location (such as a shop), or acquire the location of the terminal 100 by estimating the moving distance of the terminal 100 by using an acceleration sensor or a geomagnetic sensor.

It should be noted that there is an error in the location point 10 calculated by the location information acquiring section 101. In general, the location information acquiring section 101 calculates the location information based on the time difference between the time when a satellite transmits radio wave 1 and the time when the location information acquiring section 101 receives the radio wave 1. The reception time of the radio wave 1, however, experiences an error due to the effects of the space propagation characteristics of the radio wave 1 and the multi-paths in the urban area. This causes an error in the location point 10 calculated by the location information acquiring section 101. In order to identify the degree of such error, the location information acquiring section 101 generates location measurement accuracy information based on the measurement environment in measuring the location point 10.

The location information acquiring section 101 periodically calculates the location point 10, generates the location measurement accuracy information, acquires the measurement time 12, and transmits these as the location information data to the behavior pattern extraction apparatus 200. The time intervals at which the location point 10 is calculated by the location information acquiring section 101 may be commonly predetermined over the behavior pattern extraction system, or determined by setting the location information acquiring section 101 from the terminal 100 by the user. Instead, the time intervals may be determined in the response of the location information acquiring section 101 to an inquiry from the behavior pattern extraction apparatus 200. It should be noted that the time intervals at which the location point 10 is calculated may not be constant; the time intervals may be varied as one choice. The above is the description of the terminal 100.

Next, a description is given of the behavior pattern extraction apparatus 200 shown in FIG. 1. The behavior pattern extraction apparatus 200 includes a location information receiving section 201, a staying point extraction section 202, a representative staying point extraction section 203 and a behavior pattern record section 204. In the following, descriptions are given of respective components included in the behavior pattern extraction apparatus 200.

First, a description is given of the location information receiving section 201. The location information receiving section 201 communicates with the terminal 100 and receives the location information data of the terminal 100 transmitted from the location information acquiring section 101. The location information receiving section 200 outputs the received location information data to the staying point extraction section 202. The above is the explanation of the location information receiving section 201.

Next, a description is given of the staying point extraction section 202. The staying point extraction section 202 extracts staying points 30 and moving location points 40. The staying points 30 each indicate a specific location where the terminal 100 has been kept unmoved (or stayed) for a predetermined time. The moving location points 40 each indicate a specific location through which the terminal 100 passes in moving between staying points 30. The staying point extraction section 202 receives the location information data from the location information receiving section 201 and stores the location information so that the location information is correlated with the terminal 100. The staying point extraction section 202 extracts staying points 30 and moving location points 40 by using the location information data.

In extracting a staying point 30, the staying point extraction section 202 first determines a location measurement record 11 for each location point 10 on the basis of the location measurement accuracy information of the location point 10. The location measurement accuracy information of each location point 10 is included in the location information data received from the terminal 100. The location measurement record 11 represents the error range of the corresponding location point 10 based on the location measurement accuracy of the location point 10. That is, it can be said that the terminal 100 may be actually located at any location in the range indicated by the location measurement record 11 of the location point 10. The staying point extraction section 202 stores the location measurement records 11 thus set so that the location measurement record 11 are correlated with the location points 10 and the location measurement times 12.

Figure 2B:
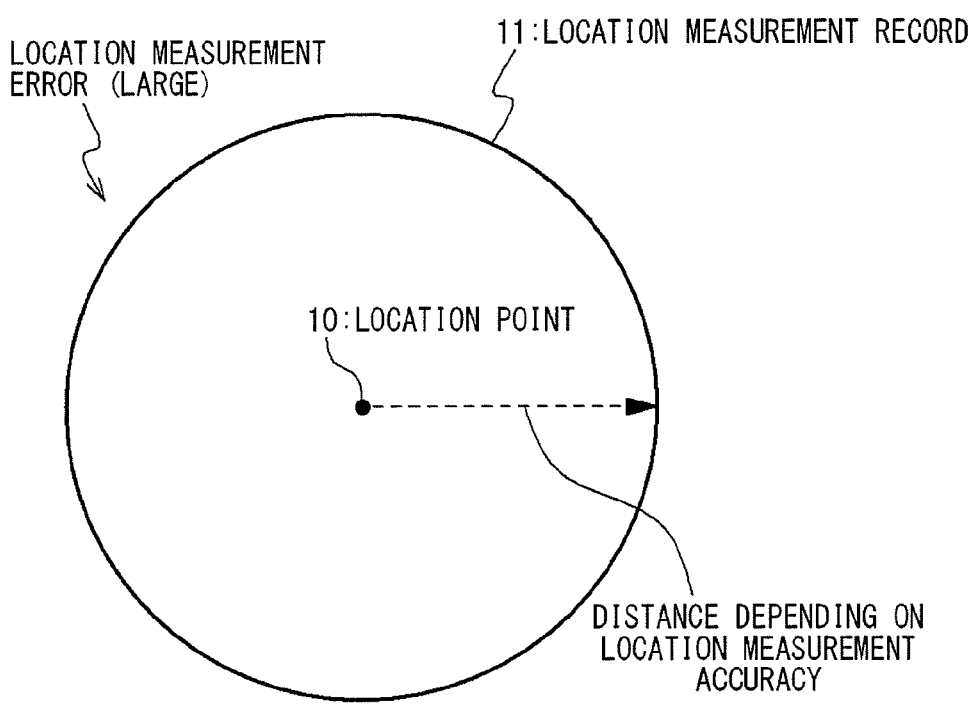
FIG. 2B is a diagram showing the relation between a location point 10 and a location measurement record 11 in the first embodiment.

Here, a description is given of the relation between a location point 10 and a location measurement record 11 in this embodiment with reference to FIGS. 2A and 2B. FIGS. 2A and 2B are diagrams showing the relation between the location point 10 and the location measurement record 11 in this embodiment. In this embodiment, the staying point extraction section 202 generates a circle with center at the location point 10 and with a radius equal to a distance determined depending on the location measurement accuracy, and defines the range included in this circle as the location measurement record 11. Here, the location measurement accuracy-depending distance is determined as being shorter as the location measurement accuracy becomes higher, and determined as being shorter as the location measurement accuracy becomes lower. Accordingly, the location measurement record 11 has a smaller area as the location measurement accuracy of the location point 10 becomes higher, and has a larger area as the location measurement accuracy of the location point 10 becomes lower. Such relation can be understood with reference to FIGS. 2A and 2B. It should be noted that the shape of the location measurement record 11 is not limited to circle; the location measurement record 11 may be determined in a different shape.

Also, the location measurement accuracy is determined depending on the level of the measurement environment in which the location information acquiring section 101 of the terminal 100 calculates the location point 10. In general, a location detection apparatus, including the location information acquiring section 101, switches the calculation methods of the location information depending on the measurement environment by the terminal 100. For example, the calculation method of the location information may include a method which involves calculating the location information only based on radio waves from GPS satellites, a method which involves calculating the location information based on radio waves from base stations included in the mobile communication network in addition to the radio waves from the GPS satellites, and a method which involves calculating the location information only based on radio waves from base stations included in the mobile communication network for addressing unsuccessful reception of radio wave from the GPS satellite. Such difference in the calculation method of the location information depending on the level of the measurement environment causes variations in the measurement accuracy. The staying point extraction section 202 acquires the measurement accuracy information for each location point 10 from the location information acquiring section 101 of the terminal 100, and determines the location measurement accuracy-depending distance in accordance with the level of the measurement environment indicated by the location measurement accuracy information to set the location measurement record 11. The above is the explanation of the relation between the location point 10 and the location measurement record 11 in this embodiment.

Referring back to FIG. 1, the description of the staying point extraction section 202 goes on. After completing the setting of the location measurement record 11 for each location point 10, the staying point extraction section 202 extracts ranges where a plurality of location measurement records 11 overlap (hereinafter, the estimated staying ranges 20). It can be said that the terminal 100 potentially has stayed for a certain period of time at a location in an estimated staying range 20, which is defined as a range where a plurality of location measurement records 11 overlap. A predetermined threshold value is set for the number of the location measurement records 11 which overlap each other in the staying point extraction section 202, and the staying point extraction section 202 extracts such a range that the number of the location measurement records 11 which overlap each other is equal to or larger than the threshold value, as an estimated staying range 11. The staying point extraction section 202 extracts the estimated staying ranges 20 where the number of the location measurement records 11 which overlap each other is equal to or larger than the threshold value, on the basis of the plurality of location measurement records 11 which are stored.

After extracting estimated staying ranges 20, the staying point extraction section 202 determines the location point 11 with the highest location measurement accuracy out of the location points 11 corresponding to the location measurement records 11 incorporating each estimated staying range 20, as a staying point 30. That is, the staying point extraction section 20 determines the location point 10 corresponding to the location measurement record 11 with the shortest location measurement accuracy-depending distance or with the smallest area, out of the location measurement records 11 incorporating each estimated staying range 20, as a staying point 30. This allows extracting the location point 10 with the highest accuracy out of the plurality of location measurement records 11, limiting the range where the terminal 100 has potentially stayed. Also, after determining a staying point 30, the staying point extraction section 202 determines the location measurement record 11 corresponding to the staying point 30 as a staying record 31.

After determining the staying point 30, the staying point extraction section 202 calculates the staying time 32. Out of the location points 10 corresponding to the location measurement records 11 incorporating the estimated staying range 20, the staying point extraction section 202 identifies the location point 10 with the earliest measurement time (hereinafter, the stay start time) and the location point 10 with the latest measurement time (hereinafter, the stay end time). The staying point extraction section 202 calculates the time duration from the stay start time to the stay end time as the staying time 32.

After calculating the staying time 32, the staying point extraction section 202 deletes the location point(s) 10 which is not determined as the staying point 30 out of the location points 10 corresponding to the location measurement records 11 incorporating the estimated staying range 20, the location measurement record(s) 11 of the location point(s) 10 and the location measurement time(s) 12 of the location point(s) 10. In this way, the staying point extraction section 202 extracts staying points 30 from a plurality of location points 10.

Also, the staying point extraction section 202 determines the location point 10 corresponding to a location measurement record 11 which has not incorporated any estimated staying range 20 for a predetermined time duration, as a moving location point 40. The staying point extraction section 202 determines the location measurement record 11 of each moving location point 40 as a movement record 41. Furthermore, the staying point extraction section 202 determines the location measurement time of each moving location point 40 as a movement time 42.

As thus described, each location point 10 corresponding to the location measurement record 11 incorporating an estimated staying range 20 is determined as a staying point 30 or subjected to deletion of the data thereof. In the meantime, data of the location point 10 corresponding to a location measurement record 11 which does not incorporate any estimated staying range 20 are left undeleted. For the location measurement record 11 of such location point 10, even when it overlaps the location measurement record 11 of another location point 10 after a certain time elapses, it cannot be said that the terminal 100 has stayed in the range where these location measurement records 11 overlap. Accordingly, the staying point extraction section 202 determines the location point 10 corresponding to a location measurement record 11 which does not incorporate any estimated staying range 20 for a predetermined time duration, as a moving location point 40. The moving location point 40 is a record of movement of the terminal 100 between a staying point 30 and another staying point 30.

The staying point extraction section 202 outputs to the representative staying point extraction section 203 the staying points 30, the staying records 31, the staying times 32 (hereinafter, these data are collectively referred to as staying point data), the moving location points 40, the movement records 41 and the movement times 42 (hereinafter, these data are collectively referred to as moving location point data).

Although the staying point extraction section 202 is described as performing the above-described processing each when the staying point extraction section 202 receives the location information from the terminal 100 in this embodiment, the staying point extraction section 202 may collectively process the location information received from the location information receiving section 201 at predetermined time intervals. Also in this case, the same process is performed in the order beginning with the location point 10 with the earliest measurement time 12. The above is the explanation of the staying point extraction section 202.

Next, a description is given of the representative staying point extraction section 203. The representative staying point extraction section 203 extracts a representative staying point 60. The representative staying point 60 indicates a place where the terminal 100 has stayed a plurality of times in the same range. The representative staying point 60 can be said as a place where the user of the terminal 100 frequently visits. The behavior pattern extraction system of this embodiment comprehends the behavior pattern of the user of the terminal 100 by extracting the representative staying point 60. The representative staying point extraction section 203 extracts a representative staying point 60 on the basis of the staying point data received from the staying point extraction section 202.

In extracting a representative staying point 60, the representative staying point extraction section 203 extracts an estimated representative staying range 50. The estimated representative staying range 50 is defined as a range where a plurality of staying records 31 of staying points 30 overlap each other. Accordingly, it can be said that the terminal 100 has stayed in the estimated representative staying range 50 a predetermined number of times or more. The representative staying point extraction section 203 extracts the range where the largest number of staying records 31 overlap each other, as an estimated representative staying range 50 for staying point data at a certain timing.

After extracting the estimated representative staying range 50, the representative staying point extraction section 203 determines the staying point 30 with the highest location measurement accuracy out of the staying points 30 corresponding to the staying records 31 incorporating the estimated representative staying range 50, as a representative staying point 60. In other words, the representative staying point extraction section 203 determines the staying point 30 corresponding to the staying record 31 with the shortest location measurement accuracy-depending distance or with the smallest area out of the staying records 31 incorporating the estimated representative staying range 50, as the representative staying point 60. Also, after determining the representative staying point 60, the representative staying point extraction section 203 determines the staying record 31 of the representative staying point 60 as the representative staying record 61.

After determining the representative staying point 60, the representative staying point extraction section 203 calculates a total staying time 62 and the number of stays 63. The representative staying point extraction section 203 calculates the total staying time 62 by summing up the staying times 32 of the staying points 30 corresponding to the respective staying records 31 incorporating the estimated representative staying range 50. Also, the representative staying point extraction section 203 calculates the number of stays 63 by counting up the number of the staying points 30 corresponding to the staying records 31 incorporating the estimated representative staying range 50. For example, the number of stays is calculated as "three" when the number of the staying points 30 corresponding to the staying records 31 incorporating the estimated representative staying range 50 is "three".

After calculating the total staying time 62 and the number of stays 63, the representative staying point extraction section 203 deletes the staying point(s) 30 which is not determined as the representative staying point 60 out of the staying points 30 corresponding to the staying records 31 incorporating the estimated representative staying range 50, and also deletes the staying record(s) 31 and the staying time(s) 32 of the deleted staying point(s) 30. The representative staying point extraction section 203 determines a representative staying point 60 from a plurality of staying points 30 in this way, to thereby extract the place where the user of the terminal 100 has repeatedly stayed.

Subsequently, the representative staying point extraction section 203 extracts the range where the largest number of staying records 30 overlap each other as another estimated representative staying range 50 for the remained staying point data. The representative staying point extraction section 203 then determines a representative staying point 60 out of the staying points 30 corresponding to the staying records 31 incorporating the estimated representative staying range 50 as described above, calculates the total staying time 62 and the number of stays 63, and deletes data related to the staying point(s) 30 which is not determined as the representative staying point 60 out of the staying points 30 corresponding to the staying records 31 incorporating the estimated representative staying range 50. The representative staying point extraction section 203 extracts representative staying points 60 from the staying point data by repeating the above-described process.

Also, the representative staying point extraction section 203 determines the staying point(s) 30 finally left undeleted in the staying point data as a result of repeating the above-described process, as a representative staying point(s) 60. Such a staying point 30 corresponds to a staying record 30 which does not overlap any staying records 31 of other staying points 30. In this case, the representative staying point extraction section 203 determines the staying record 31 of the present staying point 30 as the representative staying record 61. Furthermore, the representative staying point extraction section 203 determines the staying time 32 of the present staying point 30 as the total staying time 62, and determines the number of stays of the representative staying point 60 as one. The representative staying point extraction section 203 can extract places where the user of the terminal 100 has stayed only a small number of times by determining a staying point 30 corresponding to a staying record 31 which does not overlap any other staying records 31 in this matter.

The representative staying point extraction section 203 outputs to the behavior pattern record section 204 the representative staying point(s) 60, the representative staying record(s) 61, the total staying time 32 and the number of stays 63 (hereinafter, these data are referred to as representative staying point data) which are determined as described above. The above is the explanation of the representative staying point extraction section 203.

Next, a description is given of the behavior pattern record section 204. The behavior pattern record section 204 stores the representative staying point data as the behavior pattern information so that the representative staying point data are correlated with the terminal 100. In response to an inquiry from the behavior pattern reference apparatus 300, the behavior pattern record section 204 returns behavior pattern information. The above is the explanation of the behavior pattern record section 204.

Next, a description is given of the behavior pattern reference apparatus 300 shown in FIG. 1. The behavior pattern reference apparatus 300 is a server on which an application using the behavior pattern information stored in the behavior pattern extraction apparatus 200 is operated. Here, the application is not specifically limited if it uses the behavior pattern information. For example, the application may provide an advertisement distribution service and the like. The behavior pattern reference apparatus 300 is communicatable with the behavior pattern extraction apparatus 200. The behavior pattern reference apparatus 300 requests behavior pattern information corresponding to a specific terminal 100 to the behavior pattern extraction apparatus 200. The behavior pattern reference apparatus 300 performs a predetermined process on the basis of the behavior pattern information acquired from the behavior pattern extraction apparatus 200. Such an application server is a conventional technique and a detailed description is not given. The above is the explanation of the behavior pattern reference apparatus 300.

The respective functions of the terminal 100, the behavior pattern extraction apparatus 200 and the behavior pattern reference apparatus 300 may be realized by hardware or by software. When the functions are realized by software, the respective apparatuses realize their own functions by executing computer programs. Such computer programs are recorded in a recording medium 2 shown in FIG. 1. Examples of the recording medium 2 include a CD (compact disc), a non-volatile memory incorporating a USB (universal serial bus) interface, and an HDD (hard disk drive) of an application download server. Storage sections (not shown) of the respective apparatuses are installed with the computer programs directly from the recording medium 2 or via a network. Examples of the storage sections include a ROM (read only memory), a flash memory and an HDD. Processing sections of the respective apparatuses, such as CPUs (central processing units), realize the functions of the respective apparatuses by performing the computer programs stored in the storage sections.

The above is the explanation of the configuration of the behavior pattern extraction system in this embodiment. Although the behavior pattern extraction apparatus 200 is configured as an apparatus separated from the terminal 100 in the behavior pattern extraction system of this embodiment, the behavior pattern extraction apparatus 200 may be implemented as a component of the terminal 100. Also, the behavior pattern extraction apparatus 200 may be provided in the behavior pattern reference apparatus 300. Furthermore, the respective components of the behavior pattern extraction apparatus 200 may be arranged in physically different locations and connected via a network. That is, the configuration of the behavior pattern extraction system shown in FIG. 1 is merely one example; it can be flexibly modified which of the terminal 100, the behavior pattern extraction apparatus 200 and the behavior pattern reference apparatus 300 includes which component.

(Description of Operation Method)

Figure 3:
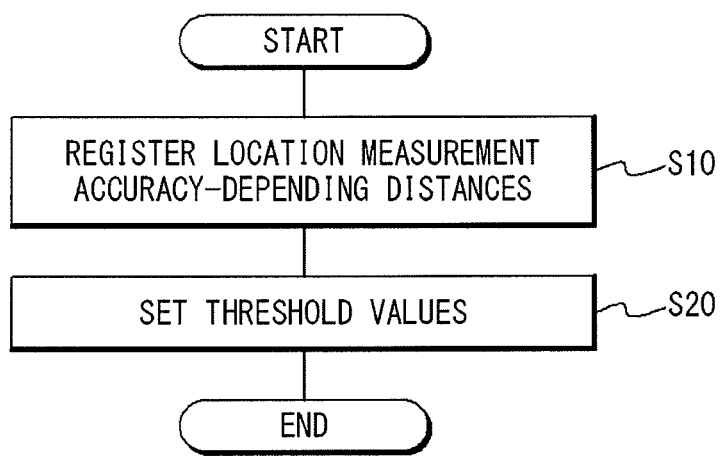
FIG. 3 shows the operation flow of achieving a preliminary setting for a behavior pattern extraction apparatus 200 in the first embodiment.

Next, the operation method of the behavior pattern extraction system in this embodiment is described below. First, a description is given of the operation method for performing an initial setting on the behavior pattern extraction apparatus 200 in this embodiment with reference to FIG. 3. FIG. 3 shows the operation flow for performing an initial setting on the behavior pattern extraction apparatus 200 in this embodiment.

(Step S10)

The administrator of the behavior pattern extraction system (hereinafter, simply referred to as the administrator) registers location measurement accuracy-dependent distances of location points 10 to the behavior pattern extraction apparatus 200. In this embodiment, the administrator sets the location measurement accuracy-dependent distances in accordance with the level of the measurement environment as described above. For example, the administrator sets a location measurement accuracy-dependent distance to a value as small as "five meters" for a measurement environment level of a good measurement environment with high location measurement accuracy (in which the location point 10 can be calculated on the basis of radio waves 1 from three GPS satellites, for example). For a measurement environment level of a poor measurement environment with low location measurement accuracy (in which the location point 10 is calculated on the basis of radio waves 1 from three wireless base stations, for example), on the other hand, the administrator sets a location measurement accuracy-dependent distance to a value as large as "15 meters". The staying point extraction section 202 of the behavior pattern extraction apparatus 200 stores therein the location measurement accuracy-dependent distances so that the location measurement accuracy-dependent distances are correlated with the levels of the measurement environments. The administrator may achieve the registration directly from an interface (not shown) of the behavior pattern extraction apparatus 200, or achieve the registration by accessing to the behavior pattern extraction apparatus 200 by using the terminal 100. It should be noted that the location measurement accuracy-dependent distances are not necessarily correlated with the levels of the measurement environments. Actual values of the distances and the level classification of the location measurement accuracy are not limited under conditions where the location measurement accuracy-dependent distance is increased as the location measurement accuracy of the location point 10 becomes low and is decreased as the location measurement accuracy of the location point 10 becomes high.

(Step S20)

The administrator sets threshold values to the behavior pattern extraction apparatus 200. These threshold values are used for the behavior pattern extraction apparatus 200 to determine staying points 30 and moving location points 40.

First, the administrator sets the threshold value for determining staying points 30. The threshold value for determining staying points 30 indicates the number of location measurement records 11 which overlap each other to form an estimated staying range 20. In this embodiment, the number of location measurement records 11 which overlap each other to form an estimated staying range 20 is set to "three". This results in that the staying point extraction section 202 extracts a range where three location measurement records 11 overlap each other as an estimated staying range 20. The staying point extraction section 202 stores therein the threshold value used for determining staying points 30, the threshold value being inputted by the administrator. It should be noted that the number of location measurement records 11 which overlap each other to form an estimated staying range 20 is described above as merely one example, and not limited to "three". The threshold value for determining staying points 30 may be set for each terminal 100. In this case, the staying point extraction section 202 stores therein the threshold value so that each threshold value is correlated to a terminal 100.

The administrator next sets the threshold value for determining moving location points 40. The threshold value for determining moving location points 40 is defines for the time duration for which the location measurement record 11 of a location point 10 does not incorporate any estimated staying range 20 from the location measurement time 12. In this embodiment, the threshold value for the time duration for which the location measurement record 11 does not incorporate any estimated staying range 20 is set to "120 minutes". This results in that, when the location measurement record 11 of a location point 10 does not incorporate any estimated staying range 20 for 120 minutes from the location measurement time 12, the staying point extraction section 202 determines the location point 10 as a moving location point 40. The staying point extraction section 202 stores therein the threshold value for determining moving location points 40, the threshold value being inputted by the administrator. It should be noted that the time duration for which the location measurement record 11 does not incorporate any estimated staying range 20 is described above as merely one example, and not limited to "120 minutes".

The administrator may achieve the registration directly from an interface (not shown) of the behavior pattern extraction apparatus 200, or achieve the registration by accessing to the behavior pattern extraction apparatus 200 by using the terminal 100.

The above is the explanation of the preliminary setting to the behavior pattern extraction apparatus 200 in this embodiment.

Figure 4:
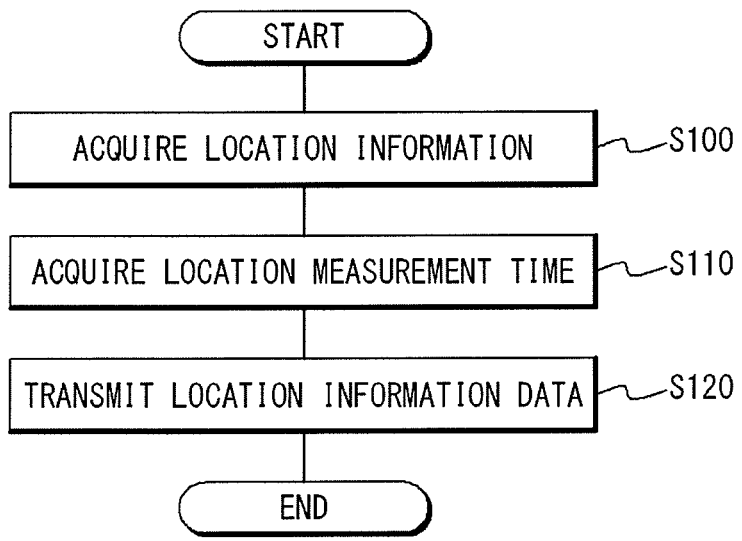
FIG. 4 shows the operation flow of a terminal 100 in the first embodiment.

Next, a description is given of the operation method of the terminal 100 in this embodiment with reference to FIG. 4. FIG. 4 shows the operation flow of the terminal 100 in this embodiment.

(Step S100)

The location information acquiring section 101 of the terminal 100 receives the radio waves from the satellites and calculates location points 10. In calculating the location points 10, the location information acquiring section 101 generates location measurement accuracy information of the location points 10. In this embodiment, the location measurement accuracy information includes the levels of the measurement environments when the location points 10 are calculated. The time intervals at which the location points 10 are calculated may be commonly predetermined by the administrator over the behavior pattern extraction system or determined by the user's setting of the terminal 100. Instead, the time intervals may be determined in the response of the location information acquiring section 101 to an inquiry from the behavior pattern extraction apparatus 200. Also, the time intervals at which the location point 10 is calculated may be constant, or may not be constant.

(Step S110)

When calculating the location points 10, the location information acquiring section 101 acquires the location measurement times 12 at the same time.

(Step S120)

The location information acquiring section 101 transmits location information data, including the location points 10, the location measurement accuracy information and the location measurement times 12, to the behavior pattern extraction apparatus 200.

The above is the explanation of the operation method of the terminal 100 in this embodiment.

Figure 5:
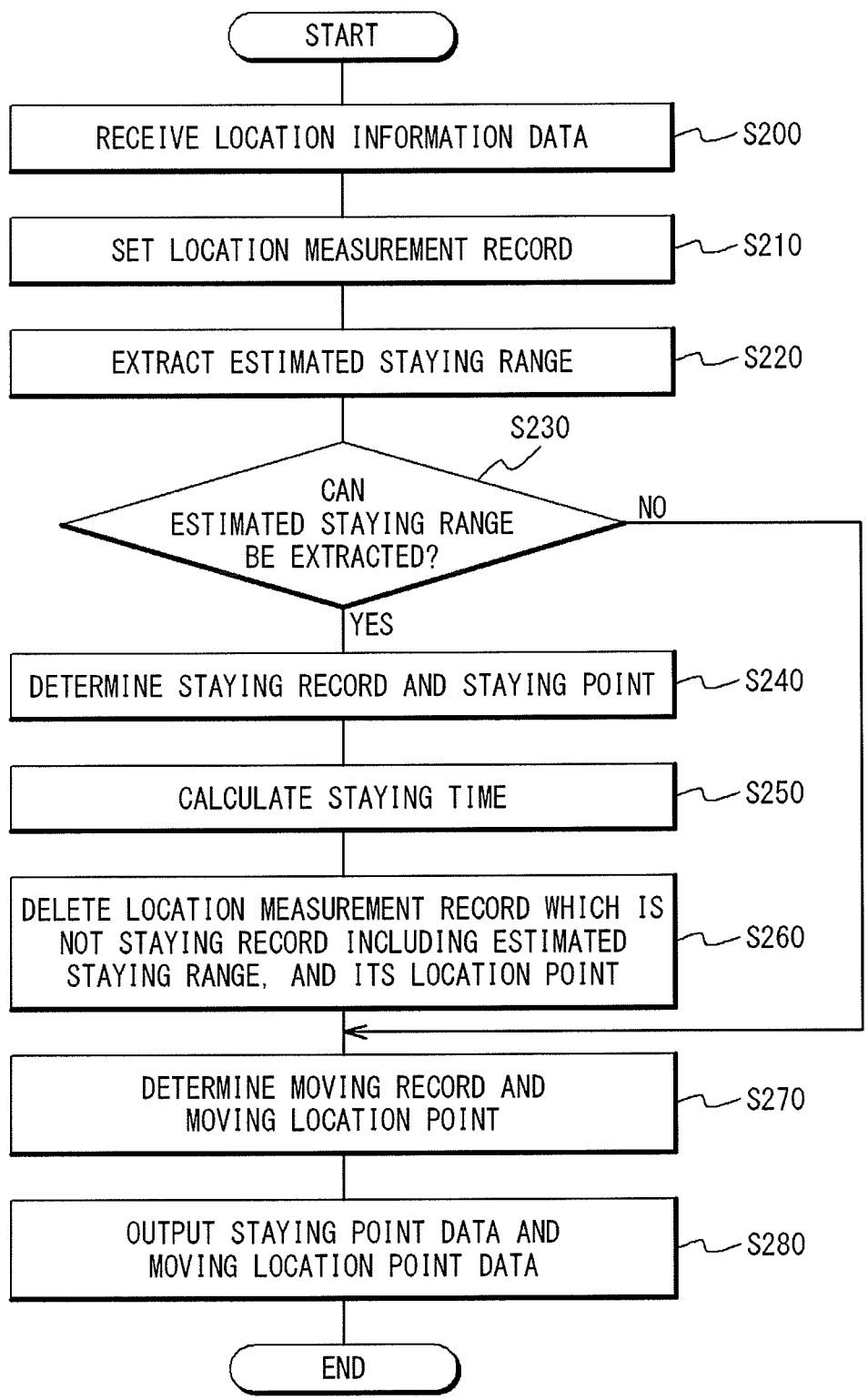
FIG. 5 shows the operation flow of determining a staying point 30 and a moving location point 40 by a staying point extraction section 202 in the first embodiment.

Next, the operation method of the behavior pattern extraction apparatus 200 in this embodiment is described below with reference to FIG. 5. Described first is the operation method of the behavior pattern extraction apparatus 200 in determining staying points 30 and moving location points 40. FIG. 5 shows the operation flow in which the behavior pattern extraction apparatus 200 determines staying points 30 and moving location points 40 in this embodiment.

(Step S200)

The location information receiving section 201 of the behavior pattern extraction apparatus 200 receives the location information data transmitted from the terminal 100. As described above, the location information data describe the location points 10, the location measurement accuracy information and the location measurement times 12. The location information receiving section 201 outputs the location information data to the staying point extraction section 202.

(Step S210)

The staying point extraction section 202 receives the location information data of the terminal 100 from the location information receiving section 201. The staying point extraction section 202 specifies the values corresponding to the location measurement accuracies from the preliminarily-stored location measurement accuracy-depending distances, on the basis of the levels of the measurement environments included in the location measurement accuracy information of the location information data. As shown in FIGS. 2A and 2B, the staying point extraction section 202 sets a circle with center at each location point 10 and with radius equal to the location measurement accuracy-depending distance, and sets the range in the circle as a location measurement record 11.

(Step S220)

After completing the setting of the location measurement record 11 for each location point 10, the staying point extraction section 202 extracts estimated staying ranges 20 on the basis of the location measurement records 11 of the location points 10 which are currently recorded. In this embodiment, the staying point extraction section 202 extracts a range where three or more location measurement records 11 overlap each other as an estimated staying range 20.

Figure 6:
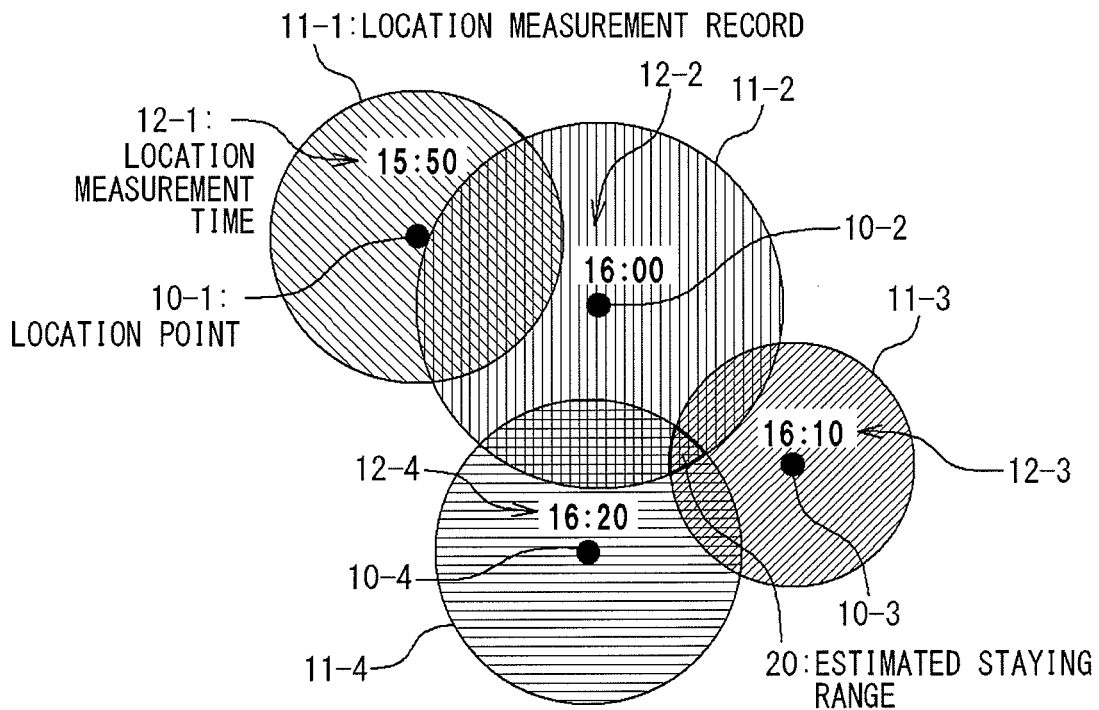
FIG. 6 is a diagram showing the correlation between location points 10 and location measurement records 11 in extracting an estimated staying range 20 by the staying point extraction section 202 in the first embodiment.

Here, the process of this step is described below, referring to FIG. 6. FIG. 6 is a diagram showing the correlation between the location points 10 and the location measurement records 11 in the case when the staying point extraction section 202 extracts an estimated staying range 20. Shown in FIG. 6 are location points 10-1 to 10-4, location measurement records 11-1 to 11-4 of the location points 10-1 to 10-4, and the location measurement time 12-1 to 12-4 of the location points 10-1 to 10-4. Let us assume that the staying point 202 is informed of the location point 10-4 on the basis of the location information data from the terminal 100 and sets the location measurement record 11-4 which corresponds to the location point 10-4. In this case, the location measurement record 11-4 partially overlaps the location measurement records 11-2 and 11-3. The staying point extraction section 202 extracts the range where the three location measurement records 11-2 to 11-4 overlap each other as an estimated staying range 20. For the location measurement records 11-1 and 11-2, which partially overlap each other, on the other hand, the number of location measurement records which overlap each other does not reach three, which is the threshold value. Accordingly, the staying point extraction section 202 does not extract the overlapping range as an estimated staying range 20.

(Step S230)

Referring back to FIG. 5, at step S230, the staying point extraction section 202 determines whether any estimated staying range 20 is successfully extracted. When an estimated staying range(s) 20 has been successfully extracted, the procedure goes on to step S240. When no estimated staying range 20 has been successfully extracted, the procedure goes on to step S270.

(Step S240)

When an estimated staying range 20 is successfully extracted, the staying point extraction section 202 determines the location point 10 with the highest location measurement accuracy out of the location points 10 corresponding to the location measurement records 11 incorporating the estimated staying range 20, as a staying point 30. Also, the staying point extraction section 202 determines the location measurement record 11 of the location point 10 which has been determined as the staying point 30, as the staying record 31.

The process of this step is described, referring back to FIG. 6. The location measurement accuracies of the location points 10-2 to 10-4 corresponding to the location measurement records 11-2 to 11-4, which incorporate the estimated staying range 20. In FIG. 6, the location measurement record 11-3, for which the shortest location measurement accuracy-depending distance is defined, has the highest location measurement accuracy out of the three location measurement records 11-2 to 11-4. Accordingly, the staying point extraction section 202 determines the location point 10-3 corresponding to the location measurement record 11-3, which is selected from the three location measurement record 11-2 to 11-4, as a staying point 30. Also, the staying point extraction section 202 determines the location measurement record 11 as the staying record 31.

(Step S250)

Referring back to FIG. 5, after determining the staying point 30 and the staying record 31, the staying point extraction section 202 identifies at step S250 the earliest measurement time 12 (hereinafter, the staying start measurement time) and the latest measurement time 12 (hereinafter, the staying end measurement time), out of the location points 10 corresponding to the location measurement records 11 incorporating the estimated staying range 20. After identifying the staying start measurement time and the staying end measurement time, the staying point extraction section 202 calculates the time length from the staying start measurement time to the staying end measurement time as the staying time 32.

Referring back to FIG. 6, the description goes on. The location measurement times 12-2 to 12-4 of the location points 10-2 to 10-4, which correspond to the location measurement records 11-2 to 11-4 incorporating the estimated staying range 20, are recorded as "16:00", "16:10" and "16:20", respectively. The staying point extraction section 202 determines the location measurement time 12-2, "16:00", as the stay start measurement time. In addition, the staying point extraction section 202 determines the location measurement time 12-4, "16:20", as the stay end measurement time. The staying point extraction section 202 calculates the time length from the stay start measurement time, "16:00", to the stay end measurement time, "16:20", as the staying time 32.

(Step S260)

Referring back to FIG. 5, after calculating the staying time 32, at step S260, the staying point extraction section 202 deletes the location point(s) 10 which has not been determined as the staying point 30, selected out of the location points 10 corresponding to the location measurement records 11 incorporating the estimated staying range 20, and deletes the location measurement record 11 and the location measurement time 12 of the deleted location point 10.

Figure 7:
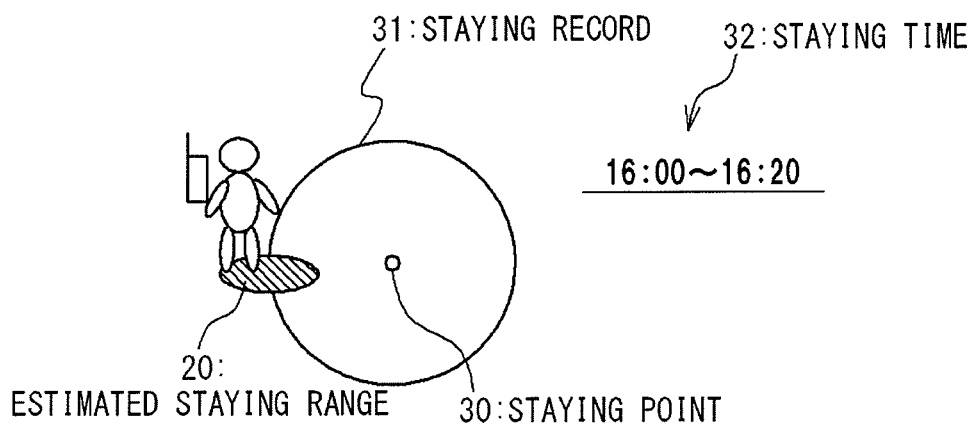
FIG. 7 is a diagram showing a staying point 30, a staying record 31 and a staying time 32 extracted from three piece of location information in the first embodiment.

The description goes on, referring back to FIG. 6. The staying point extraction section 202 has determined the location point 10-3 as the staying point 30 as described above. This implies that the location points 10-2 and 10-4 corresponding to the location measurement records 11-2 and 11-4 incorporating the estimated staying range 20 have not been determined as staying points 30. The staying point extraction section 202 deletes the location points 10-2 and 10-4, and the location measurement records 11-2 and 11-4 corresponding to the same. As thus described, the staying point extraction section 202 extracts the staying point 30, the staying record 31 and the staying time 32 on the basis of the location information data of the three location points. Here, FIG. 7 shows the staying point 30, the staying record 31 and the staying time 32, which have been extracted from the location information of the three location points in this embodiment. The location information data of the other two location points are aggregated to the staying point 30, the staying record 31 and the staying time 32.

(Step S270)

Referring back to FIG. 5, at step S270, the staying point extraction section 202 determines the location point 10 corresponding to a location measurement record 11 which has not incorporated the estimated staying range 20 for a time duration exceeding the threshold value from the location measurement time 12, as a moving location point 40. As described above, the threshold value for the time duration for which the location measurement record 11 has not incorporated the estimated staying range 20 from the location measurement time 12 is set to "120 minutes" in this embodiment. Accordingly, the staying point extraction section 202 determines the location point 10 corresponding to a location measurement record 11 which has not incorporated the estimated staying range 20 for 120 minutes from the location measurement time 12, as a moving location point 40. Also, the staying point extraction section 202 determines the location measurement record 11 of a moving location point 40 as a movement record 41 and the location measurement time 12 of the moving location point 40 as a movement time 42.

Figure 8:
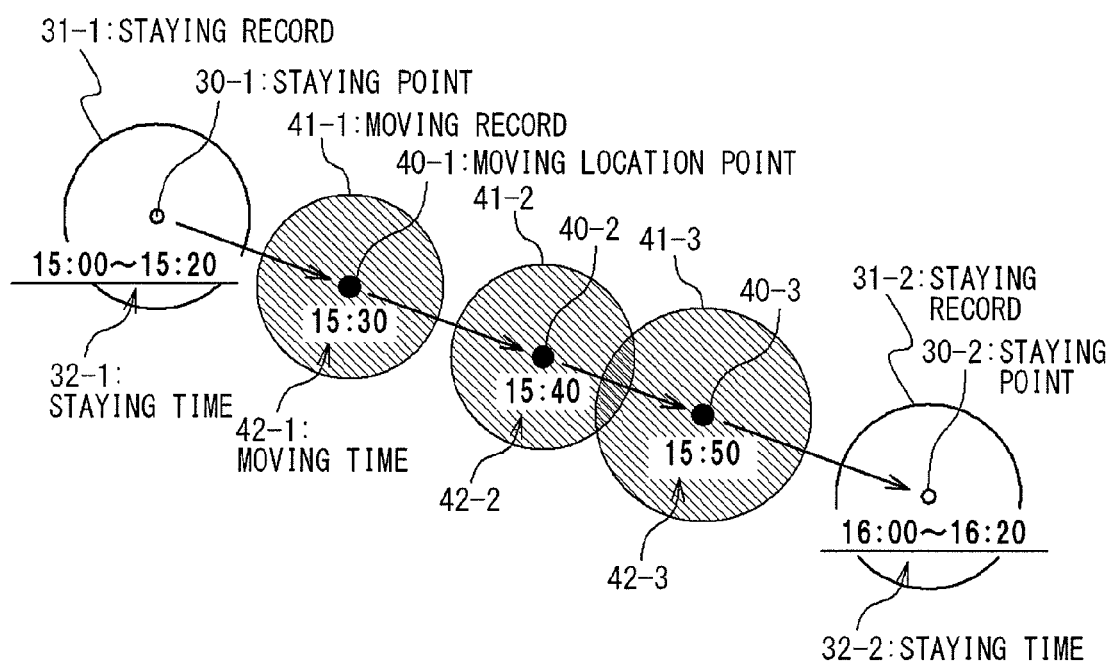
FIG. 8 is a diagram showing the relation between staying points 30 and moving location points 40 in the first embodiment.

Here, a description is given of the relation between staying points 30 and moving location points 40 in this embodiment with reference to FIG. 8. FIG. 8 is a diagram showing the relation between staying points 30 and moving location points 40 in this embodiment. Shown in FIG. 8 are staying points 30-1, 30-2, staying records 31-1, 31-2, staying time 32-1, 32-2, moving location points 40-1 to 40-3, movement records 41-1 to 41-3 and movement times 42-1 to 42-3. The staying points 30-1 and 30-2 are each determined on the basis of location information data of three location points. The moving location points 40-1 to 40-3 are defined as location points 10 corresponding to the movement records 41-1 to 41-3 which have not incorporated any estimated staying range 20 for "120 minutes", to which the threshold value is set, from the location measurement times 12. Even if the location measurement record 11 of such a location point 10 overlaps the location measurement record 11 of another location point 10 after "120 minutes" have elapsed from the location measurement time 12, the terminal 100 cannot be considered as having stayed there. Accordingly, the staying point extraction section 202 determines such a location point 10 as a moving location point 40 which has been recorded in the movement of the terminal 100. Referring to FIG. 8, it can be presumed that the terminal 100 has moved from the staying point 30-1 to the staying point 30-2 via the moving location points 40-1 to 40-3.

(Step S280)

Referring back to FIG. 5, at step S280, the staying point extraction section 202 outputs the staying point data (data of the staying points 30, the staying records 31 and staying times 32) and the moving location point data (data of the moving location points 40, the movement records 41 and movement times 42), to the representative staying point extraction section 203.

The above is the explanation of the operation method in which the behavior pattern extraction apparatus 200 determines the staying points 30 and the moving location points 40. In this embodiment, the behavior pattern extraction apparatus 200 performs the present operation flow, each when receiving the location information from the terminal 100. It should be noted that the behavior pattern extraction apparatus 200 may accumulate the location information data received from the terminal 100 and perform the present operation flow at constant time intervals or at a timing when the behavior pattern extraction apparatus 200 is externally requested by the administrator and the like.

It should be noted that the existence provability of the user at each point in the circle indicating the location measurement record 11 is strictly uniform. As described above, a location point 10 measured by the GPS has a property in which the measured location point 10 is varied little by little due to external factors. It is considered, however, that the user seldom moves in a small area little by little under an assumption that the terminal 100 is held by the user and is thereby moved. Accordingly, it can be said as provable that the user has actually stayed in the area where a plurality of circles of location measurement records 11 overlap each other. Also, the reliability of the location measurement record 11 with the highest location measurement accuracy is highest out of the location measurement records 11 which overlap each other.

For this reason, the behavior pattern extraction apparatus 200 of this embodiment extracts a range where the location measurement records 11 of a plurality of location points 10 overlap each other, as an estimated staying range 20, and extracts the location point with the highest location measurement accuracy out of the location points 10 corresponding to the location measurement records 11 incorporating an estimated staying range 20. This allows extracting the behavior pattern of the user with high accuracy.

Figure 9:
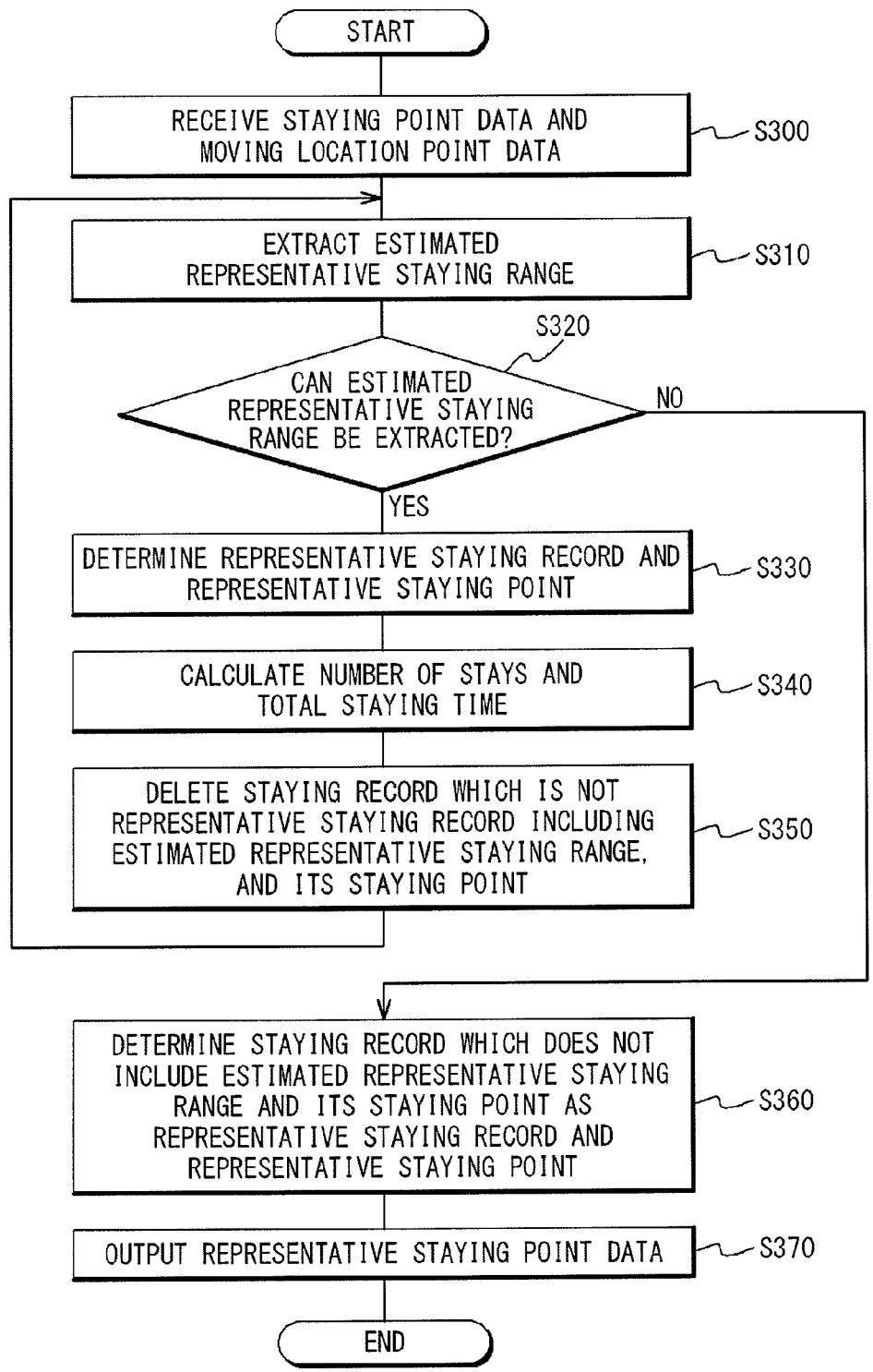
FIG. 9 shows an operation flow of determining a representative staying point 60 by a representative staying point extraction section 203 in the first embodiment.

Next, a description is given of the operation method for the representative staying point extraction section 203 of the behavior pattern extraction apparatus 200 to determine a representative staying point 60, with reference to FIG. 9. FIG. 9 shows the operation flow for the representative staying point extraction section 203 to determine a representative staying point 60 in this embodiment.

(Step S300)

The representative staying point extraction section 203 receives the staying point data and the moving location point data from the staying point extraction section 202. The representative staying point extraction section 203 stores therein the staying point data and the moving location point data so that the staying point data and the moving location point data are correlated with the terminal 100.

(Step S310)

The representative staying point extraction section 203 extracts an estimated representative staying range 50 on the basis of the staying records 31 of the staying points 30 which are currently recorded in the staying point data.

Figure 10:
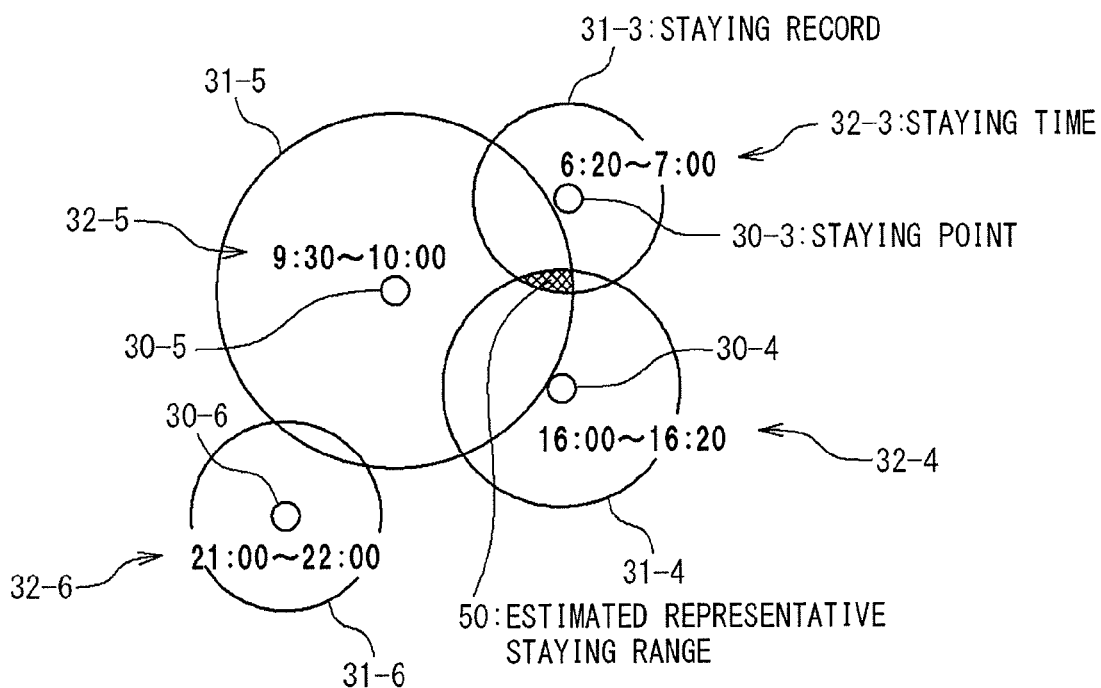
FIG. 10 is a diagram showing the relation between staying points 30 and staying records 30 in extracting an estimated representative staying range 50 by the representative staying point extraction section 203 in the first embodiment.

Here, the processing at this step is described below with reference to FIG. 10. FIG. 10 shows the relation between the staying points 30 and the staying records 31 in the case when the representative staying point extraction section 203 extracts an estimated representative staying range 50. Shown in FIG. 10 are staying points 30-3 to 30-6, staying records 31-3 to 31-6 of the staying points 30-3 to 30-6 and the staying time 32-3 to 32-6 of the staying points 30-3 to 30-6, which are described as the staying point data. Let us assume that the representative staying point extraction section 203 now starts extraction processing of a representative staying point 60. The representative staying point extraction section 203 extracts an estimated representative staying range 50, which is a range where the largest number of staying records 31 described in the currently-recorded staying point data overlap each other. In FIG. 10, the range where the staying records 31-3, 31-4 and 31-5 overlap each other is the range where the largest number of staying records overlap each other. The representative staying point extraction section 203 extracts the range where the staying records 31-3, 31-4 and 31-5 overlap each other as the estimated representative staying range 50. The range where the staying records 31-5 and 31-6 overlap each other is not the range where the largest number of staying records overlap each other; therefore the representative staying point extraction section 203 does not extract this range as an estimated representative staying range 50.

(Step S320)

Referring back to FIG. 9, at step S320, the representative staying point extraction section 203 judges whether any estimated representative staying range 50 has been successfully extracted. When an estimated representative staying range 50 has been successfully extracted, the procedure goes on to step S330. When no estimated representative staying range 50 has been successfully extracted, on the other hand, the procedure goes on to step S360.

(Step S330)

When having successfully extracted an estimated representative staying range 50, the representative staying point extraction section 203 determines the staying point 30 with the highest location measurement accuracy out of the staying points 30 corresponding to the staying records 31 incorporating the estimated representative staying range 50, as a representative staying point 60. Also, the representative staying point extraction section 203 determines the staying record 31 of the staying point 30 which has been determined as the representative staying point 60, as the representative staying record 61.

Referring back to FIG. 10, the processing of this step is described below. The staying points 30-3 to 30-5 corresponding to the staying records 31-3 to 31-5, which incorporate the estimated representative staying range 50, have different location measurement accuracies. In FIG. 10, the staying point 30 corresponding to the staying record 31 with the shortest location measurement accuracy-dependent distance out of the three staying records 31-3 to 31-5 has the highest location measurement accuracy. Accordingly, the representative staying point extraction section 203 determines the staying point 30-3 corresponding to the staying record 31-3, selected from the three staying records 31-3 to 31-5, as the representative staying point 60. Also, the representative staying point extraction section 203 determines the staying record 31 as the representative staying record 61 at the same time.
(Step S340)

Referring back to FIG. 9, after determining the representative staying point 60 and the representative staying record 61, at step S340, the representative staying point extraction section 203 calculates the total staying time 62 by summing up the staying times 32 corresponding to the staying points 30 of the staying records 31 incorporating the estimated representative staying range 50. Also, the representative staying point extraction section 203 calculates the number of stays 63 by counting up the number of the staying points 30 corresponding to the staying records 31 incorporating the estimated representative staying range 50.

The description goes on, referring back to FIG. 10. The staying points 30-3 to 30-5 corresponding to the staying records 31-3 to 31-5 incorporating the estimated representative staying range 50 are stored with the staying time 32-3 to 32-5 of "6:20-7:00", "16:00-16:20" and "9:30-10:00", respectively. The representative staying point extraction section 203 calculates the total staying time 62 as "90 minutes" by summing up the respective staying time 32-3 to 32-5. Also, the representative staying point extraction section 203 calculates the number of stays 63 as "three" by counting up the number of the staying points 30-3 to 30-5 corresponding to the staying record 31-3 to 31-5 incorporating the estimated representative staying range 50.
(Step S350)

Referring back to FIG. 9, at step S350, the staying points 30 which has not been determined as the representative staying point 60, which is selected out of the staying points 30 corresponding to the staying records 31 incorporating the estimated representative staying range 50, is deleted and the staying records 31 and the staying times 32 of these staying points 30 are also deleted. It should be noted that the procedure subsequently goes back to step S310, and another estimated representative staying range 50 is extracted by using the staying records 31 left undeleted in the staying point data. In this way, the representative staying point extraction section 203 extracts representative staying points 60 by repeating the processes of step S310 to S350 until it becomes impossible to extract any estimated representative staying range 50.

The description goes on, referring back to FIG. 10. The representative staying point extraction section 203 has determined the staying point 30-3 as the representative staying point 60 as described above. This implies that the staying points 30-4 and 30-5, which correspond to the staying records 31-4 and 31-5 incorporating the estimated representative staying range 50, have not been determined as the representative staying point 60. The representative staying point extraction section 203 deletes the staying points 30-4, 30-5, the staying records 31-4, 31-5 and the staying times 32-3 to 32-5. In this way, the representative staying point extraction section 203 extracts the representative staying point 60, the representative staying record 61, the total staying time 62 and the number of stays 63.

Figure 11:
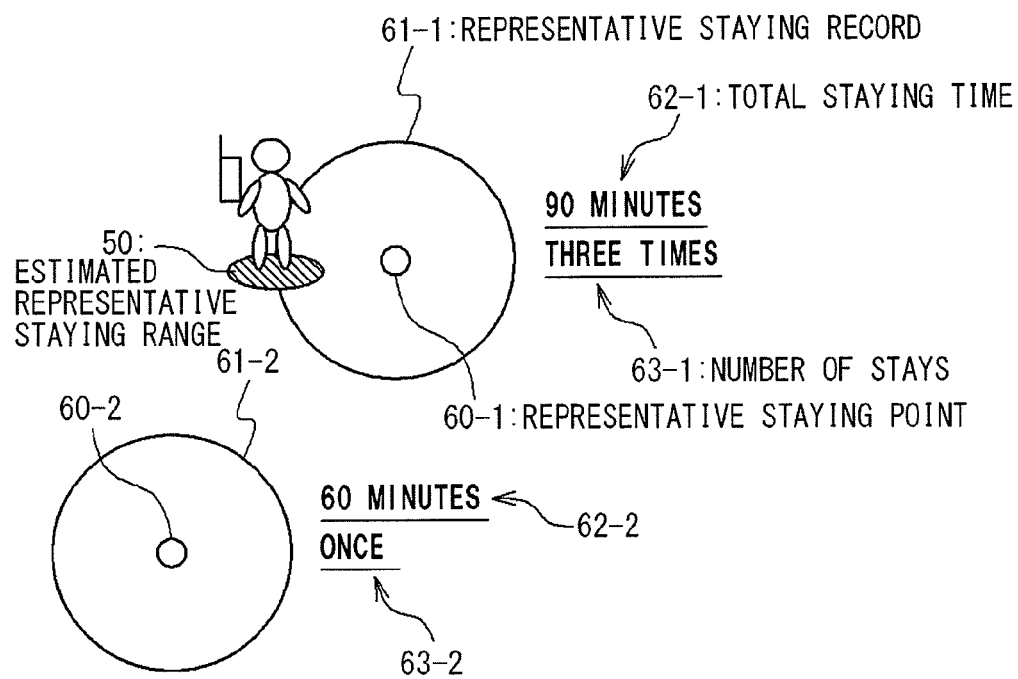
FIG. 11 is a diagram showing representative staying points 60, representative staying records 61, total staying times 62 and numbers of stays 63 extracted from three staying point data in the first embodiment.

Here, FIG. 11 is a diagram showing the representative staying points 60-1, the representative staying record 61-1, the total staying time 62-1 and the number of stays 63-1 which are extracted from the staying point data of three staying points in this embodiment. Referring to FIG. 11, the staying point data of other two staying points are aggregated to the representative staying points 60-1, the representative staying record 61-1, the total staying time 62-1 and the number of stays 63-1 and deleted.
(Step S360)

Referring back to FIG. 9, at step S360, when it becomes impossible to extract any representative staying range 50 from the staying point data, the representative staying point extraction section 203 determines a staying point(s) 30 left undeleted in the staying point data, as a representative staying point(s) 60. The representative staying point extraction section 203 determines the staying record(s) 31 of the determined representative staying point(s) 60 as a representative staying record(s) 61 and the staying time(s) 32 of the determined representative staying point(s) 60 as a total staying time(s) 62. Furthermore, the representative staying point extraction section 203 determines the number(s) of stays of the determined representative staying point(s) 60 as "one".

Referring back to FIG. 11, the processing of this step is described below. In FIG. 11, the representative staying point 60-2 is the staying point 30-6 shown in FIG. 10. The staying record 31-6 of the staying point 30-6 is described in the staying point data left undeleted after the extraction processing of the representative staying point(s) 60 by the representative staying point extraction section 203. In other words, the staying record 31-6 of the staying point 30-6 is a staying record 31 which does not incorporate any estimated representative staying range 50. The representative staying point extraction section 203 determines the staying point 30-6 as a representative staying point 60-2. At the same time, the representative staying point extraction section 203 determines the staying record 31-6 as a representative staying record 61-2, calculates the staying time 32-6 as a total staying time 62-2 of "60 minutes" and determines the number of stays 63-2 as "one". The determination in this way enables extracting the ranges where the terminal 100 has stayed, even when the number of stays is small.
(Step S370)

Referring back to FIG. 9, at step S370, the representative staying point extraction section 203 outputs representative staying point data (data of the representative staying points 60, the representative staying records 61, the total staying times 62, and the number of stays 63) to the behavior pattern record section 204.

The above is the explanation of the operation method for determining the representative staying points 60 by the behavior pattern extraction apparatus 200. It should be noted that the behavior pattern extraction apparatus 200 may perform the present operation flow, each when receiving the staying point data and the moving location point data from the staying point extraction section 202, or perform the present operation flow at predetermined time intervals, or perform present operation flow in response to an instruction of the behavior pattern record section 204 when the behavior pattern record section 204 receives a request from the behavior pattern reference apparatus 300.

Figure 12:
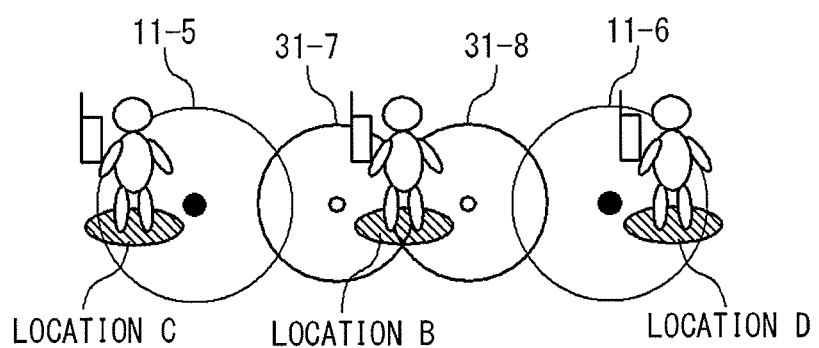
FIG. 12 is a diagram showing the relation between representative staying points 60 and the user's behavior pattern in the first embodiment.

Here, a description is given of the relation between the representative staying points 60 and the user's behavior pattern in this embodiment with reference to FIG. 12. FIG. 12 is a diagram showing the relation between the representative staying points 60 and the user's behavior pattern in this embodiment. Shown in FIG. 12 are the location measurement record 11-5, 11-6 and the staying records 31-7 and 31-8. Place B is defined in the estimated representative staying range 40, and it is considered that the user has stayed in this range in view of the above-describe processing by the behavior pattern extraction apparatus 200 of this embodiment. Strictly speaking, for the staying records 31-7 and 31-8 defined at different times, the user may actually have stayed at places C and D in the location measurement records 11-5 and 11-6, which are used as bases for determining the respective staying records 31-7 and 31-8, not have stayed at place B; however, the range where staying records 31 overlap each other can be considered as a place where the user actually stays frequently, because the user tends to frequently stay the same place, such as home, place of work, and favorite shops. On the basis of this idea, the representative staying point extraction section 203 determines a range where the staying records 31 of a plurality of staying points 30 overlap each other as an estimated representative staying range 50, and determines the staying point 30 with the highest location measurement accuracy out of the staying points 30 corresponding to the staying records 31 incorporating the estimated representative staying range 50 as an representative staying point 60.

Figure 13:
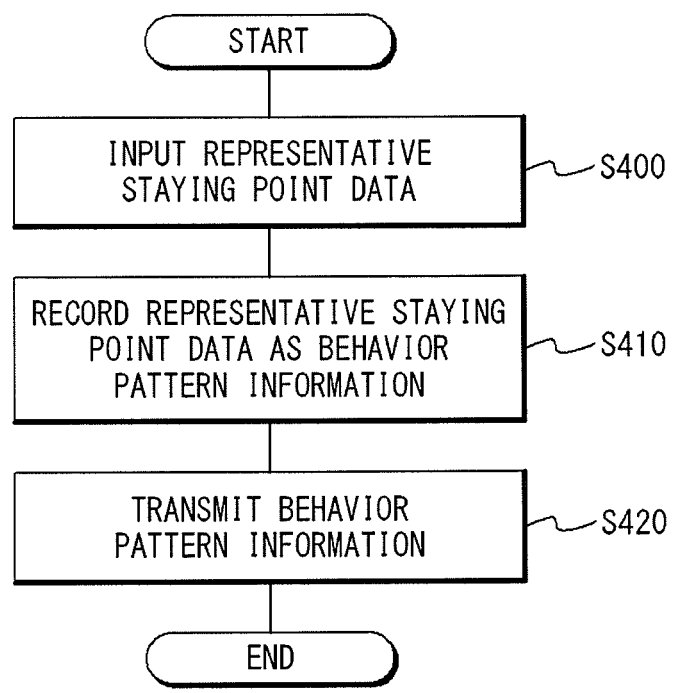
FIG. 13 shows an operation flow of a behavior pattern record section 204 in the first embodiment.

Next, a description is given of the operation method of the behavior pattern record section 204 in this embodiment with reference to FIG. 13. FIG. 13 shows the operation flow of the behavior pattern record section 204 in this embodiment.

(Step S400)

The behavior pattern record section 204 receives the representative staying point data from the representative staying point extraction section 203.

(Step S410)

The behavior pattern record section 204 stores therein the representative staying points 60, the representative staying records 61, the total staying times 62 and the numbers of stays 63, which are included in the received representative staying point data, so that they are correlated with the terminal 100.

Here, FIG. 14 is a diagram showing one example of the representative staying point data recorded in the behavior pattern record section 204 in this embodiment. The terminal identifier fields record the identifiers of the terminal 100. The representative staying range record number fields describe identification numbers arbitrarily given to the representative staying records 61. The representative staying point fields record the coordinates (x, y) specified by the location information of the representative staying points 60. The location measurement accuracy fields record the location measurement accuracies (errors Dm) of the representative staying points 60. The total staying time fields record the total staying times 62 of the representative staying points 60. The number-of-stays fields record the number of stays 63 of the representative staying points 60. It should be noted that FIG. 14 merely shows one example; the record format and the recorded contents are not limited to those shown in FIG. 14. For example, the coordinates specified by the location information of the representative staying points 60 may be recorded so as to include the altitude (elevation) information in the form of (x,y,z). Also, the location measurement accuracies may be recorded in a different unit. Furthermore, the actual stay start times and stay end times may be recorded in place of the total staying times.

(Step S420)

Referring back to FIG. 13, when receiving an acquisition request of behavior pattern information from the behavior pattern reference apparatus 300, the behavior pattern record section 204 extracts appropriate data from the recorded behavior pattern information and returns the data to the behavior pattern reference apparatus 300, at step S420.

The above is the explanation of the operation method of the behavior pattern record section 204 in this embodiment. In this manner, the behavior pattern information extracted in the behavior pattern extraction apparatus 200 is used in the behavior pattern reference apparatus 300.

In the behavior pattern extraction system of this embodiment, the staying point extraction section 202 sets location measurement records 11 for location points 10, depending on the location measurement errors of the location points 10, extracts a range where a plurality of location measurement records 11 overlap each other as an estimated staying range 20, and determines the location point 10 with the highest location measurement accuracy out of the location points 10 corresponding to the location measurement records 11 incorporating the estimated staying range 20, as a staying point 30. Although the use of a GPS suffers from variations of the measured location points 10 due to external factors, a staying point 30 of the user can be determined with high accuracy against the external factors by determining the location point 10 with the highest location measurement accuracy out of those corresponding to a plurality of overlapping location measurement records 11.

Also, the representative staying point extraction section 203 repeats a process on the basis of the staying records 31 of the staying points 30, in which process the range where the largest number of staying records overlap each other is extracted as an estimated representative staying range 50 and the staying point 30 with the highest location measurement accuracy out of the staying points 30 corresponding to the staying records 31 incorporating the estimated representative staying range 50 is determined as a representative staying point 60. This allows extracting behavior pattern information with high accuracy through a process in which ranges where the user has stayed a plurality of times are extracted, and the staying point 30 with the highest accuracy out of those corresponding to the extracted ranges is regarded as a location where the user frequently stays.

Second Embodiment

Next, a behavior pattern extraction system in a second embodiment of the present invention is described below.

The behavior pattern extraction system of this embodiment is different from that of the first embodiment in the extraction operation of staying records 31 and staying points 30. The staying point extraction section 202 of the behavior pattern extraction apparatus 200 in this embodiment sets a staying record 31 as a range which at least includes location measurement records 11 of all of a plurality of location points 10 and determines the center of the set staying record 30 as a staying point 30. This makes it possible to incorporate the whole of ranges where the terminal 100 may have stayed, covering all the location measurement records 11 corresponding to a plurality of location points 10.

(Description of Configuration)

First, the configuration of the behavior pattern extraction system of this embodiment is described below. The configuration of the behavior pattern extraction system of this embodiment is almost similar to that of the first embodiment shown in FIG. 1. A description of the components similar to those of the first embodiment is therefore omitted and a description is mainly given of components different from those of the first embodiment.

As is the case with the first embodiment, as shown in FIG. 1, the behavior pattern extraction system of this embodiment includes a terminal 100, a behavior pattern extraction apparatus 200 and a behavior pattern reference apparatus 300. Also, as is the case with the first embodiment, the behavior pattern extraction apparatus 200 includes a location information receiving section 201, a staying point extraction section 202, a representative staying point extraction section 203 and a behavior pattern record section 204, as shown in FIG. 1. The behavior pattern extraction system of this embodiment is different in that the calculation method performed in the staying point extraction section 202 of the behavior pattern extraction apparatus 200.

The staying point extraction section 202 in this embodiment is described below with reference to FIG. 1. The staying point extraction section 202 sets staying points 30 and staying records 31 on the basis of the location information data received from the terminal 100. Specifically, the staying point extraction section 202 sets a location measurement record 11 which indicates a constant error range for each location point 10, on the basis of the location measurement accuracy information of the location point 10. Next, the staying point extraction section 202 sets a staying record 31 on the basis of a plurality of location points 10 measured in a predetermined period of time and the location measurement records 11 set for the respective location points 10. In this embodiment, the staying point extraction 202 sets the staying record 31 so that the staying record 31 incorporates at least the location measurement records 11 set for the respective location points 10. The staying point extraction section 202 then calculates the center point of the set staying record 31 and determined the center point of the staying record 31 as a staying point 30.

After setting the staying point 30 and the staying record 31, the staying point extraction section 202 calculates a staying time 32. The staying point extraction section 202 identifies the earliest location measurement time 12 out of the respective location measurement times 12 of the location points 10 used for setting the staying record 31, as the stay start time, and identifies the latest location measurement time 12 as the stay end time. The staying point extraction section 202 calculates the time from the stay start time to the stay end time as the staying time 32.

After calculating the staying time 32, the staying point extraction section 202 deletes the location points 10 and the location measurement records 11 thereof used for setting the staying record 31. In this way, the staying point extraction section 202 sets a staying point 30 and a staying record 31 from a plurality of location points 10 and calculates the staying time 32.

Figure 15A:
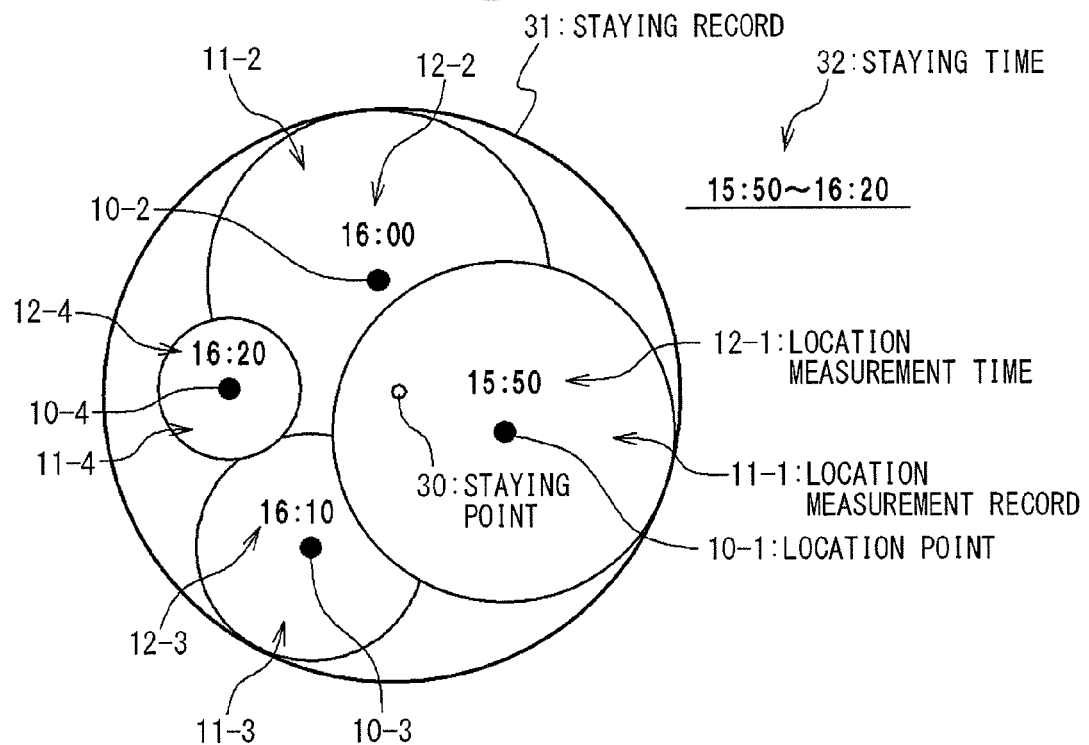
FIG. 15A is a diagram showing the correlation between location points 10 and location measurement records 11 in setting a staying point 30 and a staying record 31 by the staying point extraction section 202 in the second embodiment.

Here, the description goes on referring to FIG. 15A. FIG. 15A shows the correlation between location points 10 and location measurement records 11 in setting a staying point 30 and a staying record 31 by the staying point extraction section 202 in this embodiment. Shown in FIG. 15A are location points 10-1 to 10-4. The location points 10-1 to 10-4 have been measured in this order in a predetermined period of time by the location information acquiring section 101. Also, the staying point extraction section 202 has set location measurement records 11-1 to 11-4 for the location points 10-1 to 10-4 on the basis of the location measurement accuracies of the location points 10-1 to 10-4, in the same way as the first embodiment.

The staying point extraction section 202 of this embodiment sets a range which at least includes the entire ranges of the location measurement records 11-1 to 11-4 of the location points 10-1 to 10-4 as the staying record 31. It can be understood from FIG. 15 that the staying record 31 is set as a circle which incorporates the entire ranges of the location measurement records 11-1 to 11-4. It should be noted that, although the shape of the staying record 31 is determined as a circle in this embodiment, the shape of the staying record 31 may be different, not limited to a circle. The staying point extraction section 202 determines the center of the set staying record 31 as the staying point 30. It can be understood from FIG. 15 that the staying point 30 is set at the center point of the staying record 31.

Furthermore, the staying point extraction section 202 calculates the staying time 32 from the location measurement times 12 of the respective location points 10-1 to 10-4. In FIG. 15A, the staying point extraction section 202 identifies the location measurement time 12-1 of the location point 10-1, "15:50", which is the earliest time out of the location measurement times 12-1 to 12-4, as the stay start time, and identifies the location measurement time 12-4 of the location point 10-4, "16:20", as the stay end time. The staying point extraction section 202 calculates the time from the stay start time to the stay end time, "15:50-16:20", as the staying time 32. After setting the staying point 30 and the staying record 31 and calculating the staying time 32, the staying point extraction section 202 deletes the location points 10-1 to 10-4, the location measurement records 11-1 to 11-4 and the location measurement times 12-1 to 12-4. In this way, the staying point extraction section 202 sets staying points 30 and staying records 31 and calculates staying times 32.

The above is the explanation of the staying point extraction section 202 in this embodiment. Since each staying record 31 is set to covering all the location measurement records 11 corresponding to a plurality of location points 10 as described above, the staying record 31 incorporates the whole of ranges where the terminal 100 may have stayed.

A staying record 31 set as describe above may incorporate a range located out of the location measurement records 11. Referring to FIG. 15A, the shown staying record 31 incorporates a range located out of the location measurement records 11-1 to 11-4. In order to reduce the possibility of incorporating a range located out of the location measurement records 11, a staying record 31 may be set as described below.

When setting a staying record 31 on the basis of a plurality of location points 10 measured in a predetermined period of time, for example, the staying point extraction section 202 may set the staying record 31 to a range which at least includes the plurality of location points 10. The staying point extraction section 202 calculates the center point of the set staying record 31 and sets the center point of the staying record 31 as the staying point 30.

Figure 15B:
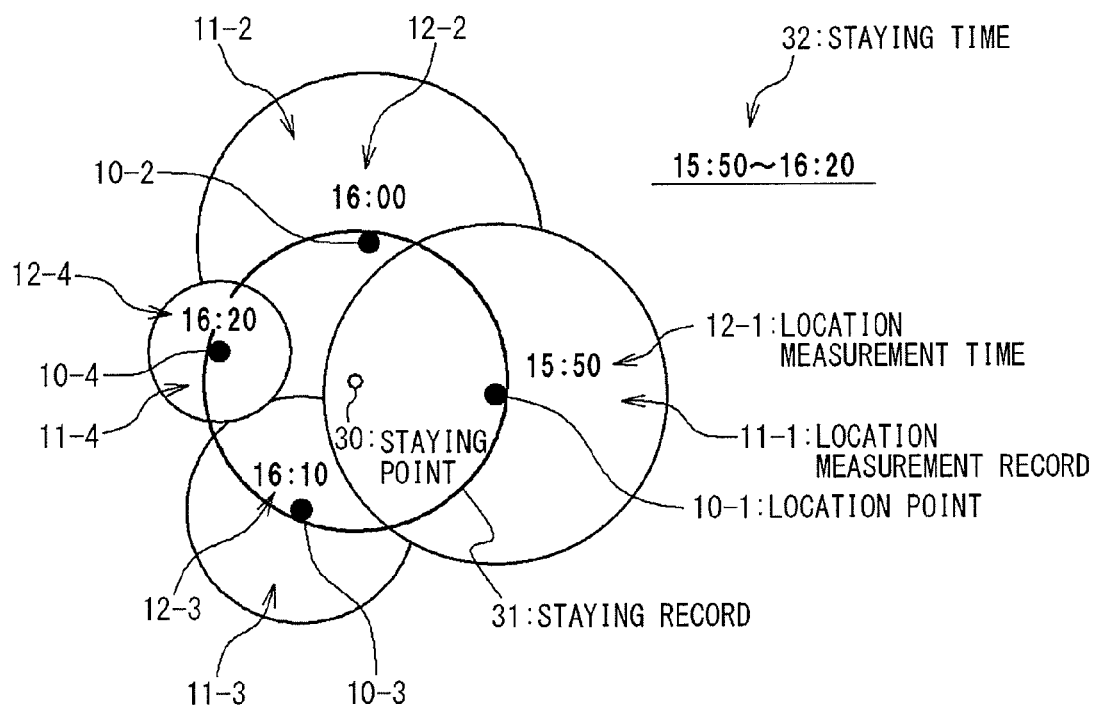
FIG. 15B is a diagram showing the correlation between location points 10 and location measurement records 11 in setting a staying point 30 and a staying record 31 by the staying point extraction section 202 in the second embodiment.

The description goes on with reference to FIG. 15B. FIG. 15B is a diagram showing the correlation between location points 10 and location measurement records 11 in setting a staying point 30 and a staying record 31 by the staying point extraction section 202 in this embodiment. Shown in FIG. 15B are location points 10-1 to 10-4, as in FIG. 15A. Let us assume that the location points 10-1 to 10-4 have been measured in this order in a predetermined period of time by the location information acquiring section 101 and informed by the terminal 100. As in the first embodiment, the staying point extraction section 202 sets location measurement records 11-1 to 11-4 for the location points 10-1 to 10-4 on basis of the location measurement accuracies of the respective location points 10-1 to 10-4.

The staying point extraction section 202 sets the staying record 31 as a range which at least incorporates the location points 10-1 to 10-4. It can be understood from FIG. 15B that the staying record 31 is set as a circle which incorporates all of the location points 10-1 to 10-4. It should be note that the shape of the staying point 31 is not limited to circle; the shape of the staying point 31 may be a different shape. The staying point extraction section 202 determines the center of the set staying record 31 as the staying point 30. It can be understood from FIG. 15B that the staying point 30 is set to the center point of the staying record 31. The staying point extraction section 202 sets the staying record 31 and the staying point 30 on the basis of a range which incorporates the location points 10-1 to 10-4 in this way, and thereby reduces the possibility that a range which is located out of the location measurement records 11-1 to 11-4 is included. The operation other than that described above is the same as that in FIG. 15A and no further description is given.

The above is the explanation of the configuration of the behavior pattern extraction system of this embodiment. The configuration other than that described above is the same as that of the first embodiment.

(Description of Operation Method)

Next, the operation method of the behavior process extraction system in this embodiment is described below. The operation method of this embodiment is almost similar to that of the first embodiment. Accordingly, a description of operations similar to those of the first embodiment is omitted and operations different from those in the first embodiment are mainly described.

Figure 16:
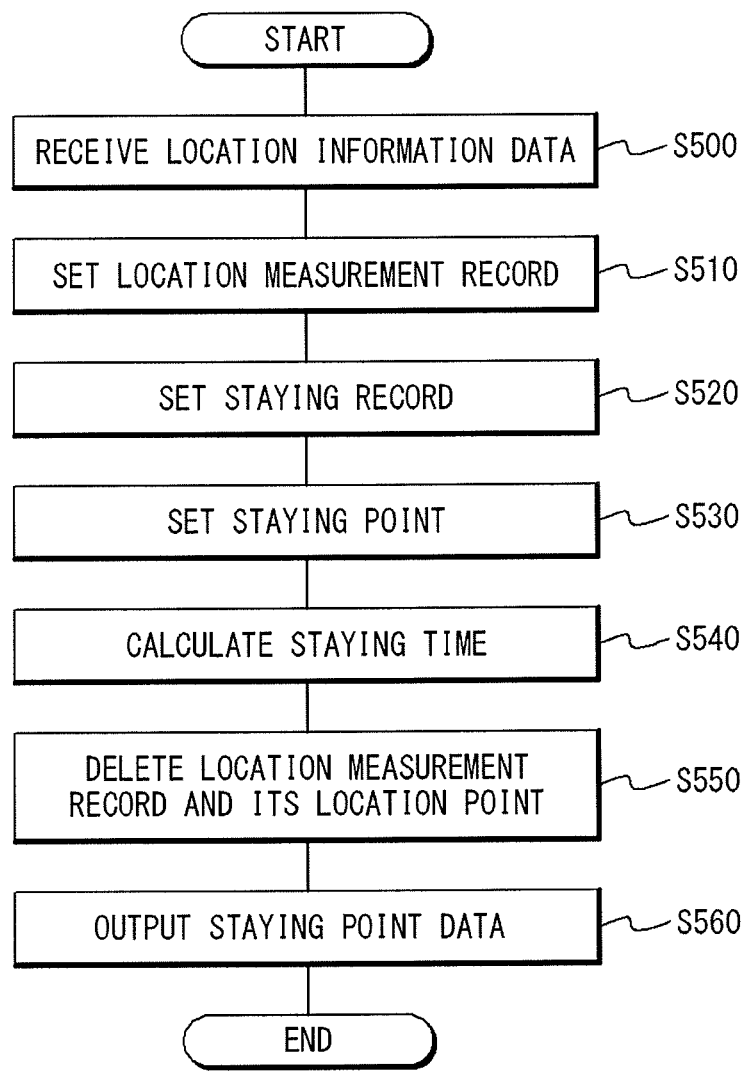
FIG. 16 shows an operation flow of setting staying points 30 and staying records 31 and calculating staying times 32 by the staying point extraction section 202 in the second embodiment.

The behavior pattern extraction system is different in the setting operation of staying points 30 and staying records 31. Accordingly, a description is given below of the operation method of setting a staying point 30 and a staying record 31 and calculating the staying time 32 by the behavior pattern extraction apparatus 200 in this embodiment, with reference to FIG. 16. FIG. 16 shows the operation flow for setting a staying point 30 and a staying record 31 and calculating the staying time 32 by the behavior pattern extraction apparatus 200 in this embodiment. It should be noted that the following description is given for the case when the staying record 31 is set as a range which incorporates all the location measurement records 11 of the plurality of location points 10.

(Steps S500 and S510)

The operations at steps S500 and S510 are the same as those at steps S200 and S210 in the first embodiment. In other words, the location information receiving section 201 of the behavior pattern extraction apparatus 200 receives location information data transmitted from the terminal 100 (step S500). The staying point extraction section 202 sets staying records 11 on the basis of the location points 10 and the location measurement accuracy information (step S510).

(Step S520)

The staying point extraction section 202 sets a staying record 31 on the basis of the location measurement records 11. Specifically, the staying point extraction section 202 sets a staying record 31 as a circle which at least incorporates all the location measurement records 11 set for a plurality of location points 10 measured in a predetermined period of time, as shown in FIG. 15A. As described above, the staying point extraction section 202 may set a staying record 31 as a circuit which at least incorporates all the location points 10 measured in a predetermined period of time, as shown in FIG. 15B. Also, the predetermined period of time is a time duration predetermined by the user or the administrator of the behavior pattern extraction system as his/her choice, and is set to the behavior pattern extraction apparatus 200 in advance.

(Step S530)

The staying point extraction section 202 calculates the center point of the staying record 31, and sets the center point as the staying point 30.

(Step S540)

The staying point extraction section 202 identifies the earliest one of the location measurement times 12 of the location points 10 used for setting the staying point 30 and the staying record 31 as the stay start time, and the latest one as the stay end time. The staying point extraction section 202 calculates the time from the stay start time to the stay end time as the staying time 32.

(Step S550)

The staying point extraction section 202 deletes the plurality of location points 10 used for setting the staying point 30 and the staying record 31 and deletes the location measurement records 11 of the deleted location points 10. In this way, the staying point 30 where the terminal 100 has stayed for the predetermined period of time and the staying record 31 are set and the staying time 32 is calculated.

(Step S560)

The staying point extraction section 202 outputs staying point data (including the staying point 30, the staying record 31 and the staying time 32) to the representative staying point extraction section 203.

The above is the explanation of the operation method of setting staying points 30 and staying records 31 and calculating the staying times 32, by the behavior pattern extraction apparatus 200 in this embodiment. The operations other than those described above are the same as those of the first embodiment; a duplicated description is not given. It should be noted that there are no moving location point 40, no moving record 41 and no moving location measurement time 42, because all the measured location points 10 are aggregated to staying points 30. Therefore, the representative staying point extraction section 203 in this embodiment does not perform processing on the moving location point data in the operation method for determining the representative staying point 60 (step S300 to S370), which is described in the first embodiment, by the behavior pattern extraction apparatus 200.

The setting method of staying points 30 and staying records 31 by the staying point extraction section 202 of this embodiment may be applied to the operation of the representative staying point extraction section 203. That is, the representative staying point extraction section 203 may set a circle which at least incorporates the entire of a plurality of staying records 31 as a representative staying record 61 on the basis of a plurality of staying records 31, and sets the center point of the representative staying record 61 as a representative staying point 60. Instead, the representative staying point extraction section 203 may set a circle which at least incorporates all of the staying points 30 as a representative staying record 61 on the basis of a plurality of staying records 30, and set the center point of the representative staying record 61 as a representative staying point 60.

The above is the explanation of the operation method of the behavior pattern extraction system in this embodiment. As thus described, in the behavior pattern extraction system of this embodiment, the staying point extraction section 202 sets a range which at least incorporates all the location measurement records 11 of a plurality of location points 10 as a staying record 31, and determines the center of the set staying record 31 as a staying point 30. This makes it possible to incorporate the whole of ranges where the terminal 100 may have stayed, covering all the location measurement records 11 corresponding to a plurality of location points 10. Also, the staying point extraction section 202 may set a range which at least incorporates all the location points 10 as a staying record, and determine the center of the set staying record 31 as a staying point 30. Such operation can suppress the possibility that the staying record 31 incorporates a range which is actually out of the location measurement records 11, although there is such possibility if the staying record 31 covers all the location measurement records 11 as described above.

Third Embodiment

Next, a behavior pattern extraction system of a third embodiment of the present invention is described below.

The behavior pattern extraction system of this embodiment is different from that of the first embodiment in the setting operation of staying records 31 and staying points 30. The staying point extraction section 202 of the behavior pattern extraction apparatus 200 in this embodiment calculates the coordinates of the median center (hereinafter, simply referred to as the median center) of a plurality of location points 10 and sets the median point as a staying point 30. Also, the staying point extraction section 202 identifies the location point 10 farthest from the staying point 30, out of the location points 10 used for setting the staying point 30, generates a circle with center at the staying point 30 and with radius equal to the distance between the staying point 30 and the identified location point 10 farthest from the staying point 30, and sets the range of this circle as a staying record 31. This allows extracting a point around which an increased number of location points 10 are concentrated as the staying point 30. Furthermore, such operation eliminates the need for setting a location measurement record 11, reducing the calculation amount necessary for calculating the staying point 30.
(Description of Configuration)

First, the configuration of the behavior pattern extraction system of this embodiment is described below. The configuration of the behavior pattern extraction system of this embodiment is almost similar to that of the first embodiment shown in FIG. 1. A description of the components similar to those of the first embodiment is therefore omitted and a description is mainly given of components different from those of the first embodiment.

As is the case with the first embodiment, as shown in FIG. 1, the behavior pattern extraction system of this embodiment includes a terminal 100, a behavior pattern extraction apparatus 200 and a behavior pattern reference apparatus 300. Also, as is the case with the first embodiment, the behavior pattern extraction apparatus 200 includes a location information receiving section 201, a staying point extraction section 202, a representative staying point extraction section 203 and a behavior pattern record section 204, as shown in FIG. 1. The behavior pattern extraction system of this embodiment is different in that the calculation method performed in the staying point extraction section 202 of the behavior pattern extraction apparatus 200.

The staying point extraction section 202 in this embodiment is described below. The staying point extraction section 202 sets staying points 30 and staying records 31 on the basis of the location information data received from the terminal 100. The staying point extraction section 202 calculates, on the basis of a plurality of location points 10 measured in a predetermined period of time, the median point of the location points 10. The staying point extraction section 202 sets the calculated median point as a staying point 30. The staying point extraction section 202 calculates the coordinates of the staying point 30, which is defined as the median point of n location points 10, on the basis of the following expression (1), using the coordinates $(x_1, y_1)$ to $(x_n, y_n)$ of the n location points 10:

Coordinates of the median point (coordinates of the staying point 30)=$((\Sigma x_n)/n, (\Sigma y_n)/n)$. (1)

After setting the staying point 30, the staying point extraction section 202 identifies the location point 10 farthest from the staying point 30, out of the location points 10 used for setting the staying point 30. The staying point extraction section 202 generates a circle with center at the staying point 30 and with radius equal to the distance between the staying point 30 and the identified location point 10 farthest from the staying point 30, and sets the range of this circle as a staying record 31.

After setting the staying point 30 and the staying record 31, the staying point extraction section 202 calculates a staying time 32. The staying point extraction section 202 identifies the earliest location measurement time 12 out of the respective location measurement times 12 of the location points 10 used for setting the staying record 31, as the stay start time, and identifies the latest location measurement time 12 as the stay end time. The staying point extraction section 202 calculates the time from the stay start time to the stay end time as a staying time 32.

After calculating the staying time 32, the staying point extraction section 202 deletes the location points 11 and the location measurement records 11 used for setting the staying record 31. In this way, the staying point extraction section 202 sets a staying point 30 and a staying record 31 from a plurality of location points 10 and calculates the staying time 32.

Figure 17:
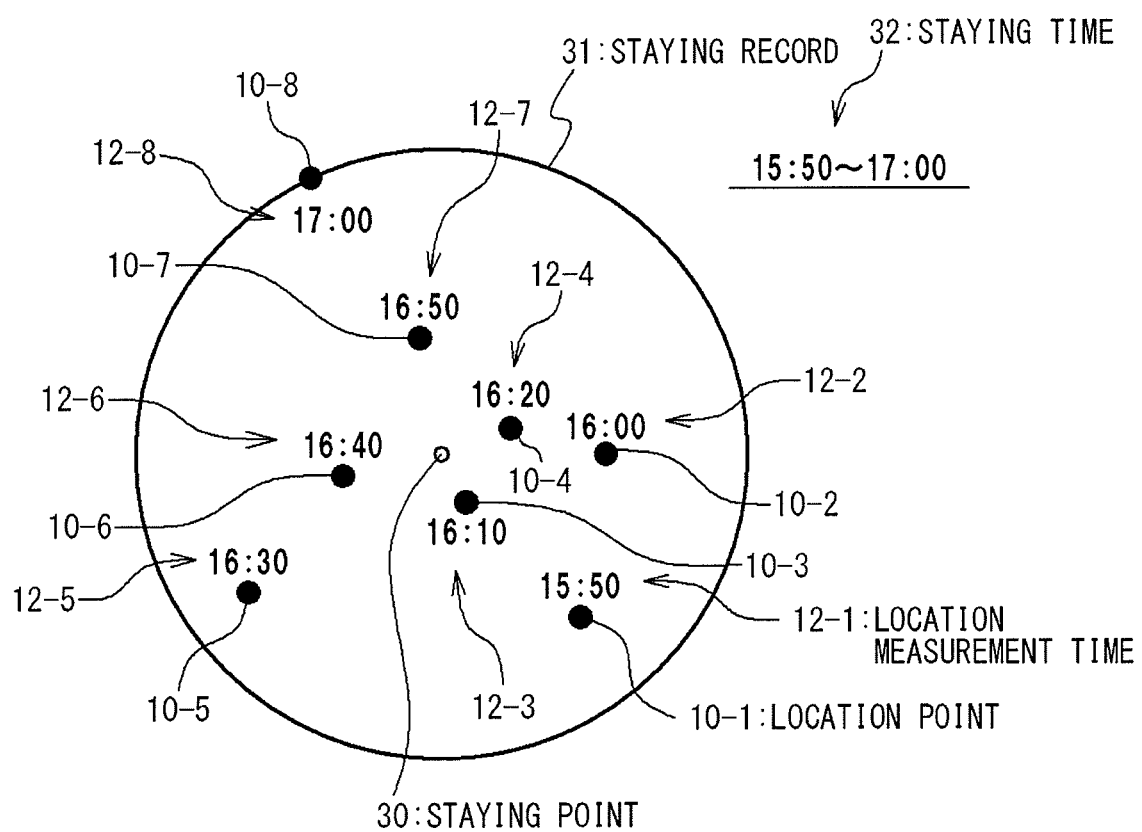
FIG. 17 is a diagram showing the correlation between location points 10 and location measurement records 11 in setting a staying point 30 and a staying record 31 by the staying point extraction section 202 in the third embodiment.

Here, the description goes on referring to FIG. 17. FIG. 17 shows the correlation between location points 10 and location measurement records 11 in setting the staying point 30 and the staying record 31 by the staying point extraction section 202 in this embodiment. Shown in FIG. 17 are location points 10-1 to 10-8. Let us assumed that the location points 10-1 to 10-8 have been measured in this order in a predetermined period of time by the location information acquiring section 101, and informed by the terminal 100. The staying point extraction section 202 calculates the median point of the location points 10-1 to 10-8, which have been measured in the predetermined period of time, by using expression (1) described above. The staying point extraction section 202 sets the calculated median point as the staying point 30. Referring to FIG. 17, the staying point 30 is set at the location which is to be determined as the median point of the location points 10-1 to 10-8.

After determining the staying point 30, the staying point extraction section 202 identifies the location point 10 farthest from the staying point 30, out of the location points 10-1 to 10-8 used for setting the staying point 30. Referring to FIG. 17, the location point 10 farthest from the staying point 30 is the location point 10-8. The staying point extraction section 202 generates a circle with center at the staying point 30 and with radius equal to the distance between the staying point 30 and the location point 10-8, and sets the range of this circle as the staying record 31. Referring to FIG. 17, the staying record 31 is set with center at the staying point 30 and with radius equal to the distance between the staying point 30 and the location point 10-8. Although the staying record 31 is defined as a circle in this embodiment, the shape of the staying record 31 is not limited to circle; the shape of the staying record 31 may be a different shape. In this way, the staying point extraction section 202 sets the staying point 30 and the staying record 31.

The staying point extraction section 202 then calculates the staying time 32 from the location measurement times 12 of the respective location points 10-1 to 10-8. In FIG. 17, the staying point extraction section 202 identifies the location measurement time 12-1 of the location point 10-1, "15:50", which is the earliest time out of the location measurement times 12-1 to 12-8, as the stay start time, and identifies the location measurement time 12-4 of the location point 10-8, "17:00", as the stay end time. The staying point extraction section 202 calculates the time from the stay start time to the stay end time, "15:50-17:00", as the staying time 32. After calculating the staying time 32, the staying point extraction section 202 deletes the location points 10 used for setting the staying point 20. In this way, the staying point extraction section 202 sets staying points 30 and staying records 31 and calculates staying times 32.

The above is the explanation of the configuration of the behavior pattern extraction system in this embodiment. The configuration other than that described above is the same as that of the first embodiment.

(Description of Operation Method)

Next, the operation method of the behavior process extraction system in this embodiment is described below. The operation method of this embodiment is almost similar to that of the first embodiment. Accordingly, a description of operations similar to those of the first embodiment is omitted and operations different from those in the first embodiment are mainly described.

Figure 18:
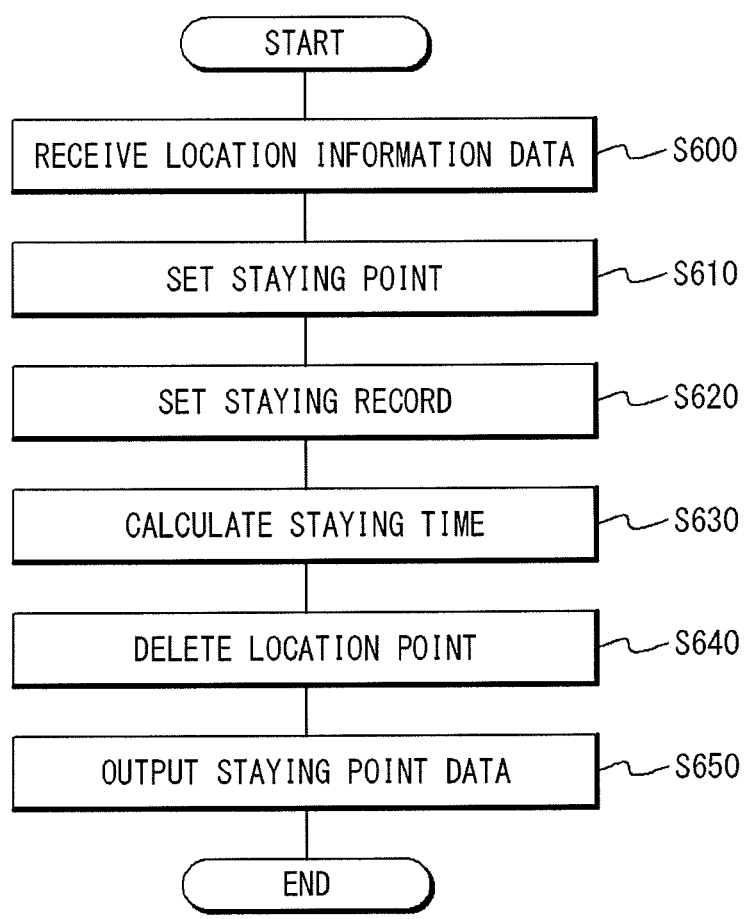
FIG. 18 shows an operation flow of setting staying points 30 and staying records 31 and calculating staying times by the behavior pattern extraction apparatus 200 in the third embodiment.

The behavior pattern extraction system is different in the setting operation of staying points 30 and staying records 31. Accordingly, a description is given below of the operation method of setting a staying point 30 and a staying record 31 and calculating the staying time 32 by the behavior pattern extraction apparatus 200, with reference to FIG. 18. FIG. 18 shows the operation flow for setting a staying point 30 and a staying record 31 and calculating the staying time 32 by the behavior pattern extraction apparatus 200 in this embodiment.

(Step S600)

The operation at step S600 is the same as that at step S200 in the first embodiment. In other words, the location information receiving section 201 of the behavior pattern extraction apparatus 200 receives location information data transmitted from the terminal 100.

(Step S610)

The staying point extraction section 202 sets staying points 30 on the basis of a plurality of location points 10. Specifically, the staying point extraction section 202 calculates, on the basis of a plurality of location points 10 measured in a predetermined period of time, the median point of the location points 10. The staying point extraction section 202 calculates the median point of the plurality of location points 10 by using the above-described expression (1). The staying point extraction section 202 sets the calculated median point as a staying point 30. It should be noted that the predetermined period of time is a time duration predetermined by the user or the administrator of the behavior pattern extraction system as his/her choice, and is set to the behavior pattern extraction apparatus 200 in advance.

(Step S620)

The staying point extraction section 202 sets a staying record 31 on the basis of the staying point 30 and the plurality of location points 10. Specifically, the staying point extraction section 202 identifies the location point 10 farthest from the staying point 30, out of the location points 10 used for setting the staying point 30. The staying point extraction section 202 generates a circle with center at the staying point 30 and with radius equal to the distance between the staying point 30 and the identified location point 10 farthest from the staying point 30, and sets the range of this circle as a staying record 31.

(Step S630)

The staying point extraction section 202 identifies the earliest one out of the respective location measurement times 12 of the location points 10 used for setting the staying point 30 and the staying record 31, as the stay start time, and identifies the latest one as the stay end time. The staying point extraction section 202 calculates the time from the stay start time to the stay end time as the staying time 32.

(Step S640)

The staying point extraction section 202 deletes the location points 10 used for setting the staying point 30 and the staying record 31. This completes the setting of the staying point 30 where the terminal 100 has stayed in a predetermined period of time and a staying record 31 and the calculation of the staying time 32.

(Step S650)

The staying point extraction section 202 outputs staying point data (including the staying point 30, the staying record 31 and the staying time 32) to the representative staying point extraction section 203.

The above is the explanation of the operation method of setting staying points 30 and staying records 31 and calculating the staying times 32, by the behavior pattern extraction apparatus 200. The operations other than those described above are the same as those of the first embodiment; a duplicated description is not given. It should be noted that there are no moving location point 40, no moving record 41 and no moving location measurement time 42, because all the measured location points 10 are aggregated to staying points 30. Therefore, the representative staying point extraction section 203 in this embodiment does not perform processing on the moving location point data in the operation method, for determining the representative staying point 60 (step S300 to S370), which is described in the first embodiment, by the behavior pattern extraction apparatus 200.

Also, the setting method of staying points 30 and staying records 31 by the staying point extraction section 202 of this embodiment may be applied to the operation of the representative staying point extraction section 203. That is, the representative staying point extraction section 203 may calculate, on the basis of a plurality of staying points 30, the median point of the staying points 30 and sets the calculated median point as a representative staying point 60. The representative staying point extraction section 203 may then identify the staying point 30 farthest from the representative staying point 60 out of the staying points 30 used for calculating the representative staying point 60, generate a circle with center at the representative staying point 60 and with radius equal to the distance between the representative staying point 60 and the staying point 30 farthest from the identified representative staying point 60, and set this circle as a representative staying record 61.

Figure 19:
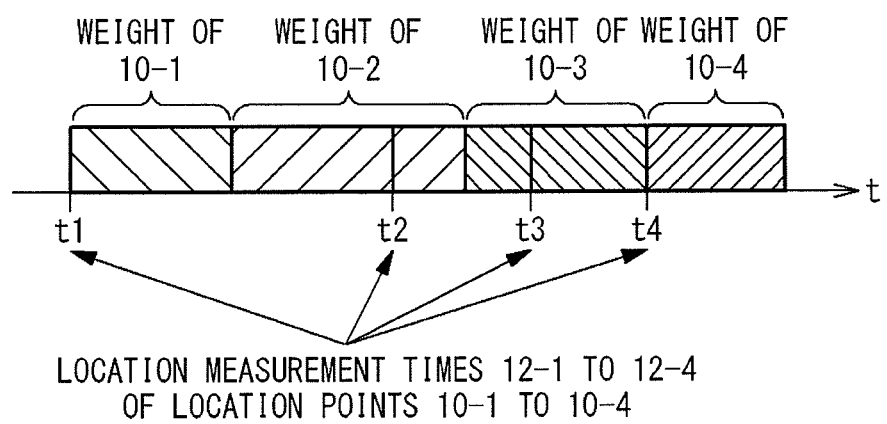
FIG. 19 is a diagram showing the relation between the positioning times 12 of location points 10 and weighting in the third embodiment.

Furthermore, the staying point extraction section 202 may perform weighting for the location points 10 used for setting a staying point 30, on the basis of the intervals of the location measured times. FIG. 19 is a diagram showing the relation between the location measurement times 12 of the location points 10 and the weighting in this embodiment. In FIG. 19, the numerals "t1" to "t4" denote the location measurement times 12 of location points 10 (for example, location points 10-1 to 10-4). In FIG. 19, it is assumed that four location points 10 have been measured. The staying point extraction section 202 performs weighting for the coordinates of the location points 10-1 to 10-4 by using $t_1$ to $t_4$, which are the location measurement times 12 thereof. The staying point extraction section 202 performs the weighting for the location points 10 on the basis of the following expression (2):

The median point coordinates (the coordinates of the staying point 30)=$(\{x1(t2-t1)/2+x2(t3-t1)/2+x3(t4-t2)/2+x4(t4-t3)/2\}/4(t4-t1),\{y1(t2-t1)/2+y2(t3-t1)/2+y3(t4-t2)/2+y4(t4-t3)/2\}/4(t4-t1))$.  (2)

In expression (2), the weighting for each location point 10 is performed on the basis of the time length between the location measurements times 12 of the previously-measured and afterward-measured location points 10. In other words, the weighting is determined in accordance with the time length of the time in which the terminal 100 has stayed near each location point 10. This is based on an idea that the terminal 100 can be considered as having stayed near a specific location point during the time between the location measurement times of the previously-measured and afterward-measured location points 10. The staying point extraction section 202 can set the location of a staying point 30 with higher accuracy by performing such weighting, because the median point is calculated in the determination of the staying point 30, taking into account the factor of the time when the terminal has stayed at each location point 10, in addition to the concentration degree of the respective location points 10. It should be noted that such weighting may be applied to the setting of representative staying points 60 by the representative staying point extraction section 203.

The above is the explanation of the operation method of the behavior pattern extraction system in this embodiment. The staying point extraction section 202 of the behavior pattern extraction apparatus 200 in this embodiment calculates the median point coordinates (hereinafter, simply referred to as the median point) of a plurality of location points 10 and sets a staying point 30 as the median point. This enables extracting a point at which location points 10 are concentrated, as a staying point 30. Also, the calculation amount of the calculation of a staying point 30 is reduced, because the setting of location measurement records 11 is not necessary. Furthermore, the location of the staying point 30 can be set with higher accuracy by performing weighting each location point 10 with the time length of the time during which the terminal 100 has stayed at each location point 10.

Although the present invention has been described with reference to embodiments, the present invention is not limited to the above-described embodiments. The configuration and details of the present invention may be implemented with various modifications comprehensible to the person skilled in the art within the scope of the present invention.

Also, the present invention may be implemented as each embodiment independently, or implemented as a combination of the configurations and operation methods of the respective embodiments. For example, staying points may be set in accordance with the method of the first embodiment, and a representative staying point may be set in accordance with the method of the second embodiment or the third embodiment.

The present application claims the priority based on Japanese Patent Application No. 2009-237423, filed on Oct. 14, 2009, the disclosure of which is incorporated herein by reference.

The invention claimed is:

1. A behavior pattern extraction system, comprising:
a location information acquiring section configured to measure location points which each indicate a location of a user;
a staying point extraction section configured to set location measurement records based on location measurement accuracies of said location points, and to set staying points and staying records based on the location measurement records, wherein each of the location measurement records is defined as a region included in a circle, each circle having a center at a respective one of the location points with a radius determined based on a location measurement accuracy of the respective one of the location points, and wherein the staying points indicate locations where said user has stayed temporarily, and the staying records indicate error ranges of said locations of said staying points;
a representative staying point extraction section configured to set a representative staying point and a representative staying record based on a range in which said staying points are concentrated, wherein the representative staying point indicates a location where said user has repeatedly visited, and the representative staying record indicates an error range of a location of said representative staying point; and
a behavior pattern record section configured to record said representative staying point and said representative staying record in a storage area as behavior pattern information of said user.

2. The behavior pattern extraction system according to claim 1, wherein said staying position extraction section is further configured to extract estimated staying ranges where the number of overlapping ones of said location measurement records is equal to or more than a predetermined number, to determine each of the staying points as the location point corresponding to the location measurement record with the highest location measurement accuracy out of said location measurement records incorporating each of said estimated staying ranges, and to determine each of the staying records as the location record of the location point determined as each of the staying points.

3. The behavior pattern extraction system according to claim 2, wherein said representative staying point extraction section is further configured to extract an estimated representative staying range where the largest number of said staying records of said staying points overlap each other, to determine said representative staying point as the staying point of the staying record with the highest one of said location measurement accuracies out of said staying records including said estimated representative staying range, and to determine the representative staying record as the staying record of the staying point which is determined as said representative staying point.

4. The behavior pattern extraction system according to claim 3, wherein said representative staying point extraction section is further configured to set said representative staying point to the staying point corresponding to a staying record which does not overlap any other staying records of said staying points out of said staying points, and to set the staying record of the staying point set as said representative staying point, as said representative staying record.

5. The behavior pattern extraction system according to claim 2, wherein said representative staying point extraction section is further configured to set a range covering said staying records of all of said staying points set in a certain period of time as said representative staying record, and to set said representative staying point as a center of said representative staying record.

6. The behavior pattern extraction system according to claim 2, wherein said representative staying point extraction section is further configured to set a range covering all of said staying points set in a certain period of time as said representative staying record, and to set said representative staying point to a center of said representative staying record.

7. The behavior pattern extraction system according to claim 2, wherein said representative staying point extraction section is further configured to set said representative staying point to a median point of said staying points, and to set a range of a circle as said representative staying record, wherein a center of the circle is said representative staying point, and a radius of the circle is a distance from said representative staying point to the staying point which is farthest from said representative staying point out of said staying points.

8. The behavior pattern extraction system according to claim 1, wherein said staying point extraction section is further configured to determine each of the staying records as a range which at least includes location measurement records of all of said location points measured in a certain period of time, and to determine each of said staying points as a center of each of said staying records.

9. A behavior pattern extraction system comprising:
a location information acquiring section configured to measure location points which each indicate a location of a user;
a staying point extraction section configured to set staying points and staying records based on ranges in which said location points are concentrated, wherein the staying points indicate locations where said user has stayed temporarily, and the staying records indicate error ranges of said locations of said staying points;
a representative staying point extraction section configured to set a representative staying point and a representative staying record based on a range in which said staying points are concentrated, wherein the representative staying point indicates a location where said user has repeatedly visited, and the representative staying record indicates an error range of a location of said representative staying point; and
a behavior pattern record section configured to record said representative staying point and said representative staying record in a storage area as behavior pattern information of said user,
wherein said staying point extraction section is further configured to perform weighting for each of said location points based on intervals of location measurement times of said location points measured in a certain period of time, and to determine each of said staying points as a weighted median point of said location points measured in the certain period of time based on said weighting, and
wherein said staying point extraction section is further configured to determine each of the staying records as a range of a circle having a center at a respective one of the staying points with a radius equal to a distance from the respective one of the staying points to the location point which is farthest from the respective one of the staying points out of said location points measured in the certain period of time.

10. A behavior pattern extraction system comprising:
a location information acquiring section configured to measure location points which each indicate a location of a user;
a staying point extraction section configured to set staying points and staying records based on ranges in which said location points are concentrated, wherein the staying points indicate location where said user has stayed temporarily, and the staying records indicate error ranges of said locations of said staying points;
a representative staying point extraction section configured to set a representative staying point and a representative staying record based on a range in which said staying points are concentrated, wherein the representative staying point indicates a location where said user has repeatedly visited, and the representative staying record indicates an error range of a location of said representative staying point; and
a behavior pattern record section configured to record said representative staying point and said representative staying record in a storage area as behavior pattern information of said user,
wherein said representative staying point extraction section is further configured to perform weighting for each of said staying points based on intervals of location measurement times of said staying points and to determine each of said staying points as a weighted median point of said location points measured in a certain period of time based on said weighting, and
wherein said representative staying point extraction section is further configured to set a median point of said staying points, and to set a range of a circle as said representative staying record, wherein a center of the circle is said representative staying point, and a radius of the circle is a distance from said representative staying point to the staying point which is farthest from said representative staying point out of said staying points.

11. A behavior pattern extraction apparatus used in a behavior pattern extraction system, comprising:
a staying point extraction section configured to set location measurement records based on location points each indicating a location of a user and location measurement accuracies of the location points, and to set staying points and staying records based on the location measurement records, wherein each of the location measurement records is defined as a region included in a circle, each circle having a center at a respective one of the location points with a radius determined based on a location measurement accuracy of the respective one of the location points, and wherein the staying points indicate locations where said user has stayed temporarily, and the staying records indicate error ranges of said locations of said staying points;
a representative staying point extraction section configured to set a representative staying point and a representative staying record based on a range in which said staying points are concentrated, wherein the representative staying point indicates a location where said user has repeatedly visited, and the representative staying record indicates an error range of a location of said representative staying point; and
a behavior pattern record section configured to record said representative staying point and said representative staying record in a storage area as behavior pattern information of said user.

12. A behavior pattern extraction method, comprising:
measuring location points which each indicate a location of a user;
setting location measurement records based on location measurement accuracies of said location points, wherein each of the location measurement records is defined as a region included in a circle, each circle having a center at a respective one of the location points with a radius determined based on a location measurement accuracy of the respective one of the location points, setting staying points and staying records based on the location measurement records, wherein the staying points indicate locations where said user has stayed temporarily, and the staying records indicate error ranges of said locations of said staying points;

setting a representative staying point and a representative staying record based on a range in which said staying points are concentrated, wherein the representative staying point indicates a location where said user has repeatedly visited, and the representative staying record indicates an error range of a location of said representative staying point; and recording said representative staying point and said representative staying record in a storage area as behavior pattern information of said user.

13. The behavior pattern extraction method according to claim 12, wherein setting said staying points and said staying records includes:

extracting estimated staying ranges where the number of overlapping ones of said location measurement records of said location points is equal to or more than a predetermined number;

determining each of said staying points as the location point corresponding to the location measurement record with the highest location measurement accuracy out of said location measurement records incorporating each of said estimated staying ranges; and determining each of the staying records as the location measurement record of said location point determined as each of said staying points.

14. The behavior pattern extraction method according to claim 13, wherein setting said representative staying point and said representative staying record includes:

extracting an estimated representative staying range where the largest number of said staying records of said staying points overlap each other;

determining said representative staying point as the staying point of the staying record with the highest one of said location measurement accuracies out of said staying records including said estimated representative staying range; and determining the representative staying record as the staying record of the staying point which is determined as said representative staying point.

15. The behavior pattern extraction method according to claim 14, wherein setting said representative staying point and said representative staying record further includes:

setting said representative staying point as the staying point corresponding to a staying record which does not overlap any other staying records of said staying points, out of said staying points.

16. The behavior pattern extraction method according to claim 13, wherein setting said representative staying point and said representative staying record includes:

setting a range covering said staying records of all of said staying points set in a certain period of time as said representative staying record; and setting said representative staying point to a center of said representative staying record.

17. The behavior pattern extraction method according to claim 13, wherein setting said representative staying point and said representative staying record includes:

setting a range covering all of said staying points set in a certain period of time as said representative staying record, and setting said representative staying point to a center of said representative staying record.

18. The behavior pattern extraction section according to claim 12, wherein setting said staying points and said staying records includes:

determining each of the staying records as a range which at least includes location measurement records of all of said location points measured in a certain period of time; and determining each of said staying points as a center of each of said staying records.

19. A behavior pattern extraction method comprising:

measuring location points which each indicate a location of a user;

setting staying points and staying records based on ranges in which said location points are concentrated, wherein the staying points indicate locations where said user has stayed temporarily, and the staying records indicate error ranges of said locations of said staying points;

setting a representative staying point and a representative staying record based on a range in which said staying points are concentrated, wherein the representative staying point indicates a location where said user has repeatedly visited, and the representative staying record indicates an error range of a location of said representative staying point; and recording said representative staying point and said representative staying record in a storage area as behavior pattern information of said user, wherein setting said staying points and said staying records includes:

performing weighting for each of said location points based on intervals of location measurement times of said location points measured in a certain period of time; and determining each of said staying points as a weighted median point of said location points measured in the certain period of time based on said weighting, and wherein each of the staying records is determined as a range of a circle having a center at a respective one of the staying points with a radius equal to a distance from the respective one of the staying points to the location point which is farthest from the respective one of the staying points out of said location points measured in the certain period of time.

20. A behavior pattern extraction method comprising measuring location points which each indicate a location of a user;

setting staying points and staying records based on ranges in which said location points are concentrated, wherein the staying points indicate locations where said user has stayed temporarily, and the staying records indicate error ranges of said locations of said staying points;

setting a representative staying point and a representative staying record based on a range in which said staying points are concentrated, wherein the representative staying point indicates a location where said user has repeatedly visited, and the representative staying record indicates an error range of a location of said representative staying point; and recording said representative staying point and said representative staying record in a storage area as behavior pattern information of said user wherein of setting said staying points and said staying records includes:

performing weighting for each of said staying points based on intervals of location measurement times of said staying points, and determining said representative staying point as a weighted median point of said location points measured in the certain time period of time based on said weighting, and wherein each of the staying records is determined as a range of a circle having a center at a respective one of the staying points with a radius equal to a distance from the respective one of the staying points to the location point which is farthest from the respective one of the staying points out of said location points measured in the certain period of time.

21. A non-transitory computer-readable recording medium recording a behavior pattern extraction program which when executed causes a computer to perform a behavior pattern extraction method, said method comprising:

setting location measurement records based on location points each indicating a location of a user and location measurement accuracies of the location points, wherein each of the location measurement records is defined as a region included in a circle, each circle having a center at a respective one of the location points with a radius determined based on a location measurement accuracy of the respective one of the location points, setting staying points and staying records based on the location measurement record, wherein the staying points indicate locations where said user has stayed temporarily, and the staying records indicate error ranges of said locations of said staying points;

setting a representative staying point and a representative staying record based on a range in which said staying points are concentrated, wherein the representative staying point indicates a location where said user has repeatedly visited, and the representative staying record indicates an error range of a location of said representative staying point; and recording said representative staying point and said representative staying record in a storage area as behavior pattern information of said user.

* * * * *